US008879846B2

(12) United States Patent
Amtrup et al.

(10) Patent No.: US 8,879,846 B2
(45) Date of Patent: Nov. 4, 2014

(54) SYSTEMS, METHODS AND COMPUTER PROGRAM PRODUCTS FOR PROCESSING FINANCIAL DOCUMENTS

(71) Applicant: Kofax, Inc., Irvine, CA (US)

(72) Inventors: Jan W. Amtrup, Chevy Chase, MD (US); Stephen Michael Thompson, Oceanside, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/175,999

(22) Filed: Feb. 7, 2014

(65) Prior Publication Data
US 2014/0153830 A1 Jun. 5, 2014

Related U.S. Application Data

(63) Continuation-in-part of application No. 13/948,046, filed on Jul. 22, 2013, which is a continuation of application No. 13/691,610, filed on Nov. 30, 2012, now Pat. No. 8,526,739, and a continuation of application No. 12/368,685, filed on Feb. 10, 2009, now Pat. No. 8,345,981.

(51) Int. Cl.
G06K 9/46 (2006.01)
G06K 9/68 (2006.01)
G06K 9/00 (2006.01)
G06F 17/20 (2006.01)
H04N 1/40 (2006.01)
G06Q 10/10 (2012.01)

(52) U.S. Cl.
CPC ........ *G06K 9/00469* (2013.01); *G06K 9/00442* (2013.01); *G06F 17/20* (2013.01); *H04N 1/40* (2013.01); *G06Q 10/10* (2013.01)
USPC .......................................... 382/190; 382/218

(58) Field of Classification Search
None
See application file for complete search history.

(56) References Cited

U.S. PATENT DOCUMENTS 5,159,667 A 10/1992 Borrey et al.
5,313,527 A 5/1994 Guberman et al.
5,467,407 A 11/1995 Guberman et al.

(Continued)

FOREIGN PATENT DOCUMENTS

EP 1956518 8/2008
JP 09116720 5/1997

(Continued)

OTHER PUBLICATIONS

Non-Final Office Action from U.S. Appl. No. 12/368,685 dated Mar. 29, 2012.

(Continued)

*Primary Examiner* — Daniel Mariam
(74) *Attorney, Agent, or Firm* — Zilka-Kotab, PC

(57) ABSTRACT

In one embodiment, a method includes receiving an image of a tender document; performing optical character recognition (OCR) on the image; extracting an identifier of the tender document from the image based at least in part on the OCR; comparing the extracted identifier with content from one or more data sources; requesting complementary information from at least one of the one or more data sources based at least in part on the extracted identifier; receiving the complementary information; and outputting at least some of the complementary information for display on a mobile device. Exemplary systems and computer program products are also described.

25 Claims, 6 Drawing Sheets

(56) References Cited

U.S. PATENT DOCUMENTS

| | | |
|---|---|---|
| 5,473,742 A | 12/1995 | Polyakov et al. |
| 5,699,244 A | 12/1997 | Clark, Jr. et al. |
| 6,073,148 A | 6/2000 | Rowe et al. |
| 6,098,065 A | 8/2000 | Skillen et al. |
| 6,501,855 B1 | 12/2002 | Zelinski |
| 6,512,848 B2 | 1/2003 | Wang et al. |
| 6,658,147 B2 | 12/2003 | Gorbatov et al. |
| 6,667,774 B2 | 12/2003 | Berman et al. |
| 6,882,983 B2 | 4/2005 | Furphy et al. |
| 6,917,709 B2 | 7/2005 | Zelinski |
| 6,950,555 B2 | 9/2005 | Filatov et al. |
| 7,020,320 B2 | 3/2006 | Filatov |
| 7,168,614 B2 | 1/2007 | Kotovich et al. |
| 7,174,043 B2 | 2/2007 | Lossev et al. |
| 7,181,082 B2 | 2/2007 | Feng |
| 7,194,471 B1 | 3/2007 | Nagatsuka et al. |
| 7,201,323 B2 | 4/2007 | Kotovich et al. |
| 7,249,717 B2 | 7/2007 | Kotovich et al. |
| 7,337,389 B1 | 2/2008 | Woolf et al. |
| 7,349,888 B1 | 3/2008 | Heidenreich et al. |
| 7,382,921 B2 | 6/2008 | Lossev et al. |
| 7,409,633 B2 | 8/2008 | Lerner et al. |
| 7,416,131 B2 | 8/2008 | Fortune et al. |
| 7,430,310 B2 | 9/2008 | Kotovich et al. |
| 7,464,066 B2 | 12/2008 | Zelinski et al. |
| 7,478,332 B2 | 1/2009 | Buttner et al. |
| 7,528,883 B2 | 5/2009 | Hsu |
| 7,639,387 B2 | 12/2009 | Hull et al. |
| 7,657,091 B2 | 2/2010 | Postnikov et al. |
| 7,673,799 B2 | 3/2010 | Hart et al. |
| 7,739,127 B1 | 6/2010 | Hall |
| 7,778,457 B2 | 8/2010 | Nepomniachtchi et al. |
| 7,787,695 B2 | 8/2010 | Nepomniachtchi et al. |
| 7,949,167 B2 | 5/2011 | Krishnan et al. |
| 7,949,176 B2 | 5/2011 | Nepomniachtchi |
| 7,953,268 B2 | 5/2011 | Nepomniachtchi |
| 7,978,900 B2 | 7/2011 | Nepomniachtchi et al. |
| 8,000,514 B2 | 8/2011 | Nepomniachtchi et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,094,976 B2 | 1/2012 | Berard et al. |
| 8,135,656 B2 | 3/2012 | Evanitsky |
| 8,194,965 B2 | 6/2012 | Lossev et al. |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,379,914 B2 | 2/2013 | Nepomniachtchi et al. |
| 8,452,098 B2 | 5/2013 | Nepomniachtchi et al. |
| 8,483,473 B2 | 7/2013 | Roach et al. |
| 8,503,797 B2 | 8/2013 | Turkelson et al. |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,620,058 B2 | 12/2013 | Nepomniachtchi et al. |
| 8,639,621 B1* | 1/2014 | Ellis et al. ............... 705/41 |
| 8,677,249 B2 | 3/2014 | Buttner et al. |
| 8,705,836 B2 | 4/2014 | Gorski et al. |
| 8,774,516 B2 | 7/2014 | Amtrup et al. |
| 8,823,991 B2 | 9/2014 | Borrey et al. |
| 2003/0002068 A1 | 1/2003 | Constantin et al. |
| 2004/0083119 A1 | 4/2004 | Schunder |
| 2004/0090458 A1 | 5/2004 | Yu et al. |
| 2004/0143796 A1 | 7/2004 | Lerner et al. |
| 2004/0181482 A1 | 9/2004 | Yap |
| 2005/0060162 A1 | 3/2005 | Mohit et al. |
| 2005/0065903 A1 | 3/2005 | Zhang et al. |
| 2005/0100209 A1 | 5/2005 | Lewis et al. |
| 2005/0131780 A1 | 6/2005 | Princen |
| 2005/0160065 A1 | 7/2005 | Seeman |
| 2005/0193325 A1 | 9/2005 | Epstein |
| 2005/0204058 A1 | 9/2005 | Philbrick et al. |
| 2005/0246262 A1 | 11/2005 | Aggarwal |
| 2006/0048046 A1 | 3/2006 | Joshi et al. |
| 2006/0089907 A1* | 4/2006 | Kohlmaier et al. ........... 705/40 |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0159364 A1 | 7/2006 | Poon et al. |
| 2006/0215231 A1 | 9/2006 | Borrey et al. |
| 2006/0219773 A1* | 10/2006 | Richardson ................ 235/379 |
| 2006/0235732 A1 | 10/2006 | Miller et al. |
| 2006/0242180 A1* | 10/2006 | Graf et al. ................... 707/101 |
| 2006/0263134 A1 | 11/2006 | Beppu |
| 2006/0265640 A1 | 11/2006 | Albornoz et al. |
| 2006/0282442 A1* | 12/2006 | Lennon et al. ............. 707/100 |
| 2006/0282762 A1 | 12/2006 | Diamond et al. |
| 2006/0288015 A1 | 12/2006 | Schirripa et al. |
| 2007/0016848 A1 | 1/2007 | Rosenoff et al. |
| 2007/0046982 A1 | 3/2007 | Hull et al. |
| 2007/0047782 A1 | 3/2007 | Hull et al. |
| 2007/0118794 A1 | 5/2007 | Hollander et al. |
| 2007/0128899 A1 | 6/2007 | Mayer |
| 2007/0165801 A1 | 7/2007 | Devolites et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0005678 A1 | 1/2008 | Buttner et al. |
| 2008/0097936 A1 | 4/2008 | Schmidtler |
| 2008/0133388 A1 | 6/2008 | Alekseev et al. |
| 2008/0137971 A1 | 6/2008 | King |
| 2008/0144881 A1 | 6/2008 | Fortune |
| 2008/0147561 A1 | 6/2008 | Euchner et al. |
| 2008/0177643 A1 | 7/2008 | Matthews et al. |
| 2008/0183576 A1 | 7/2008 | Kim et al. |
| 2008/0212115 A1 | 9/2008 | Konishi |
| 2008/0215489 A1 | 9/2008 | Lawson et al. |
| 2009/0214112 A1 | 8/2009 | Borrey et al. |
| 2010/0060915 A1 | 3/2010 | Suzuki et al. |
| 2010/0202698 A1 | 8/2010 | Schmidtler |
| 2010/0232706 A1 | 9/2010 | Forutanpour |
| 2010/0280859 A1* | 11/2010 | Frederick, II ................ 705/7 |
| 2011/0013039 A1 | 1/2011 | Aisaka et al. |
| 2011/0116716 A1 | 5/2011 | Kwon et al. |
| 2011/0249905 A1 | 10/2011 | Singh et al. |
| 2012/0114249 A1 | 5/2012 | Conwell |
| 2012/0162527 A1 | 6/2012 | Baker |
| 2012/0194692 A1 | 8/2012 | Mers et al. |
| 2012/0284122 A1 | 11/2012 | Brandis |
| 2013/0022231 A1 | 1/2013 | Nepomniachtchi et al. |
| 2013/0060596 A1 | 3/2013 | Gu et al. |
| 2013/0088757 A1 | 4/2013 | Schmidtler |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1* | 5/2013 | Roach et al. ................ 705/44 |
| 2013/0182970 A1 | 7/2013 | Shustorovich et al. |
| 2013/0182973 A1 | 7/2013 | Macciola et al. |
| 2013/0230246 A1 | 9/2013 | Nuggehalli |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0308832 A1 | 11/2013 | Schmidtler |
| 2014/0006198 A1 | 1/2014 | Daly et al. |
| 2014/0012754 A1* | 1/2014 | Hanson et al. ............. 705/44 |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270536 A1 | 9/2014 | Amtrup et al. |

FOREIGN PATENT DOCUMENTS

| | | |
|---|---|---|
| JP | 2003196357 | 7/2003 |
| JP | 2005018678 | 1/2005 |
| JP | 2005173730 | 6/2005 |

(56) References Cited

FOREIGN PATENT DOCUMENTS

| JP | 2006209588 | 8/2006 |
|----|------------|--------|
| JP | 2008134683 | 6/2008 |
| TW | 401553 | 8/2000 |
| WO | WO9847098 | 10/1998 |
| WO | WO02063812 | 8/2002 |

OTHER PUBLICATIONS

Notice of Allowance and Fee(s) Due from U.S. Appl. No. 12/368,685 dated Aug. 30, 2012.
Non-Final Office Action from U.S. Appl. No. 13/691,610 dated Mar. 1, 2013.
Notice of Allowance and Fee(s) Due from U.S. Appl. No. 13/691,610 dated Jun. 24, 2013.
Non-Final Office Action from U.S. Appl. No. 13/948,046 dated Dec. 6, 2013.
Notice of Allowance from Japanese application No. 2011-549266 dated Dec. 18, 2013.
Japanese Office Action from application No. 2011-549266 dated Sep. 4, 2013.
European Search Report from application No. 10741580.4 dated Sep. 26, 2012.
International Preliminary Report and Written Opinion from PCT application No. PCT/US2010/023224 dated Aug. 25, 2011.
International Search Report and Written Opinion from PCT application No. PCT/US2010/23224 dated Apr. 5, 2010.
Brauer et al., "Robust recognition of complex entities in text exploiting enterprise data and NLP-techniques," 2008 IEEE, Third International Conference on Digital Information Management, Nov. 13, 2008, pp. 551-558.
Rainardi, V., "Building a Data Warehouse: With Examples in SQL Server, Chapter 15: Other Data Warehouse Usage," Apress, Dec. 27, 2007, pp. 471-474.
Non-Final Office Action from U.S. Appl. No. 14/078,402 dated Jan. 30, 2014.
"AutoMatch," www.ucoa.com/products/automatch, retrieved Jan. 22, 2009.
Intsig Information Co., Ltd., "Product Descriptions," www.intsig.com/en/product.html, retrieved Oct. 25, 2012.
Intsig Information Co., Ltd., "CamScanner," www.intsig.com/en/camscanner.html, retrieved Oct. 25, 2012.
European Exam Report from Application No. 10741580.4, dated Jan. 6, 2014.
Preliminary Office Action from Taiwanese Application No. 096118505, dated Sep. 7, 2011.
Notice of Allowance from Taiwan Application No. 096118505, dated Nov. 9, 2012.
Notice of Allowance from U.S. Appl. No. 13/948,046, dated Jun. 2, 2014.
Notice of Allowance from U.S. Appl. No. 11/805,857, dated Sep. 10, 2008.
Requirement for Restriction from U.S. Appl. No. 12/331,875, dated Aug. 4, 2011.
Non-Final Office Action from U.S. Appl. No. 12/331,875, dated Dec. 22, 2011.
Final Office Action from U.S. Appl. No. 12/331,875, dated Jun. 19, 2012.
Non-Final Office Action from U.S. Appl. No. 12/331,875, dated Apr. 9, 2013.
Notice of Allowance from U.S. Appl. No. 12/331,875, dated Oct. 25, 2013.
Requirement for Restriction from U.S. Appl. No. 14/177,136, dated May 19, 2014.
Non-Final Office Action from U.S. Appl. No. 14/220,016, dated May 22, 2014.
Non-Final Office Action from U.S. Appl. No. 14/220,023, dated May 5, 2014.
Non-Final Office Action from U.S. Appl. No. 14/220,029, dated May 14, 2014.
Notice of Allowance and Fee(s) Due from U.S. Appl. No. 14/078,402 dated Feb. 26, 2014.
Gllavata, et al., "Finding Text in Images Via Local Thresholding," International Symposium on Signal Processing and Information Technology, Dec. 2003, pp. 539-542.
Zunino, et al., "Vector Quantization for License-Plate Location and Image Coding," IEEE Transactions on Industrial Electronics, vol. 47, Issue 1, Feb. 2000, pp. 159-167.
International Search Report and Written Opinion from PCT Application No. PCT/US14/26569, dated Aug. 12, 2014.
International Search Report and Written Opinion from PCT Application No. PCT/US2014/036673, dated Aug. 28, 2014.
International Search Report and Written Opinion from PCT Application No. PCT/US14/35176, dated Sep. 18, 2014.
International Search Report and Written Opinion from PCT Application No. PCT/US14/26597, dated Sep. 19, 2014.
Final Office Action from U.S. Appl. No. 14/176,006, dated Sep. 3, 2014.
Final Office Action from U.S. Appl. No. 14/220,023, dated Sep. 18, 2014.
Notice of Allowance from U.S. Appl. No. 13/740,123, dated Jul. 10, 2014.
Notice of Allowance from U.S. Appl. No. 13/740,139, dated Aug. 29, 2014.
Notice of Allowance from U.S. Appl. No. 14/268,876, dated Aug. 29, 2014.
Notice of Allowance from U.S. Appl. No. 14/334,558, dated Sep. 10, 2014.
Non-Final Office Action from U.S. Appl. No. 14/268,876, dated Jul. 24, 2014.
Requirement for Restriction from U.S. Appl. No. 14/259,866, dated Jul. 11, 2014.
U.S. Appl. No. 14/340,460, filed Jul. 24, 2014.
U.S. Appl. No. 14/473,950, filed Aug. 29, 2014.
U.S. Appl. No. 14/491,901, filed Sep. 19, 2014.

* cited by examiner

SYSTEMS, METHODS AND COMPUTER PROGRAM PRODUCTS FOR PROCESSING FINANCIAL DOCUMENTS

PRIORITY APPLICATIONS

This application is a continuation-in-part of U.S. patent application Ser. No. 13/948,046, filed Jul. 22, 2013, which is a continuation of U.S. patent application Ser. No. 13/691,610, filed Nov. 30, 2012, which is a continuation of U.S. Pat. No. 8,345,981 to Schmidtler et al., from each of which priority is claimed and each of which is herein incorporated by reference.

RELATED APPLICATIONS

This application is related to U.S. patent application Ser. No. 14/176,006, filed Feb. 7, 2014 and, entitled Systems, Methods and Computer Program Products for Determining Document Validity.

FIELD OF THE INVENTION

The present invention relates to document analysis systems, methods, and computer program products, and more particularly, this invention relates to systems, methods, and computer program products for determining validity of financial documents, and for financial processing using financial document image data.

BACKGROUND OF THE INVENTION

In the present day, business transactions are recorded as an exchange of information between two or more parties. The information is generated by the sender and can come to the receiver via a variety of means, e.g. via a paper document, an electronic document, etc. Within a business transaction it is implicitly assumed that both parties have some information about the document content and the type of transaction.

Many times, the receiving party has to validate the content of the received document by comparing the document's content with its view of the transaction. This, for example, can be achieved by a human reading the document and comparing the document content to corresponding content already in the recipient's possession. However, the layout and the forms of documents differ vastly between senders and are loosely structured, making the automatic extraction and recognition of the relevant information very challenging and inaccurate. Moreover, such manual review is both time consuming and expensive.

Therefore, there is a current need for an improved method of automatic business transaction document validation.

SUMMARY

In one embodiment, a method includes: receiving an image of a tender document; performing optical character recognition (OCR) on the image; extracting an identifier of the tender document from the image based at least in part on the OCR; comparing the extracted identifier with content from one or more data sources; requesting complementary information from at least one of the one or more data sources based at least in part on the extracted identifier, receiving the complementary information; and outputting at least some of the complementary information for display on a mobile device.

In another embodiment, a system includes: logic in and/or executable by the processor and configured to cause the processor to: receive an image of a tender document; perform optical character recognition (OCR) on the image; extract an identifier of the tender document from the image based at least in part on the OCR; compare the extracted identifier with content from one or more data sources; request complementary information from at least one of the one or more data sources based at least in part on the extracted identifier; receive the complementary information; and output at least some of the complementary information for display on a mobile device.

In still another embodiment, a computer program product includes: a computer readable storage medium having embodied thereon non-transitory computer readable instructions, the computer readable instructions being configured to cause a processor to: receive an image of a tender document; perform optical character recognition (OCR) on the image; extract an identifier of the tender document from the image based at least in part on the OCR; compare the extracted identifier with content from one or more data sources; request complementary information from at least one of the one or more data sources based at least in part on the extracted identifier; receive the complementary information; and output at least some of the complementary information for display on a mobile device.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
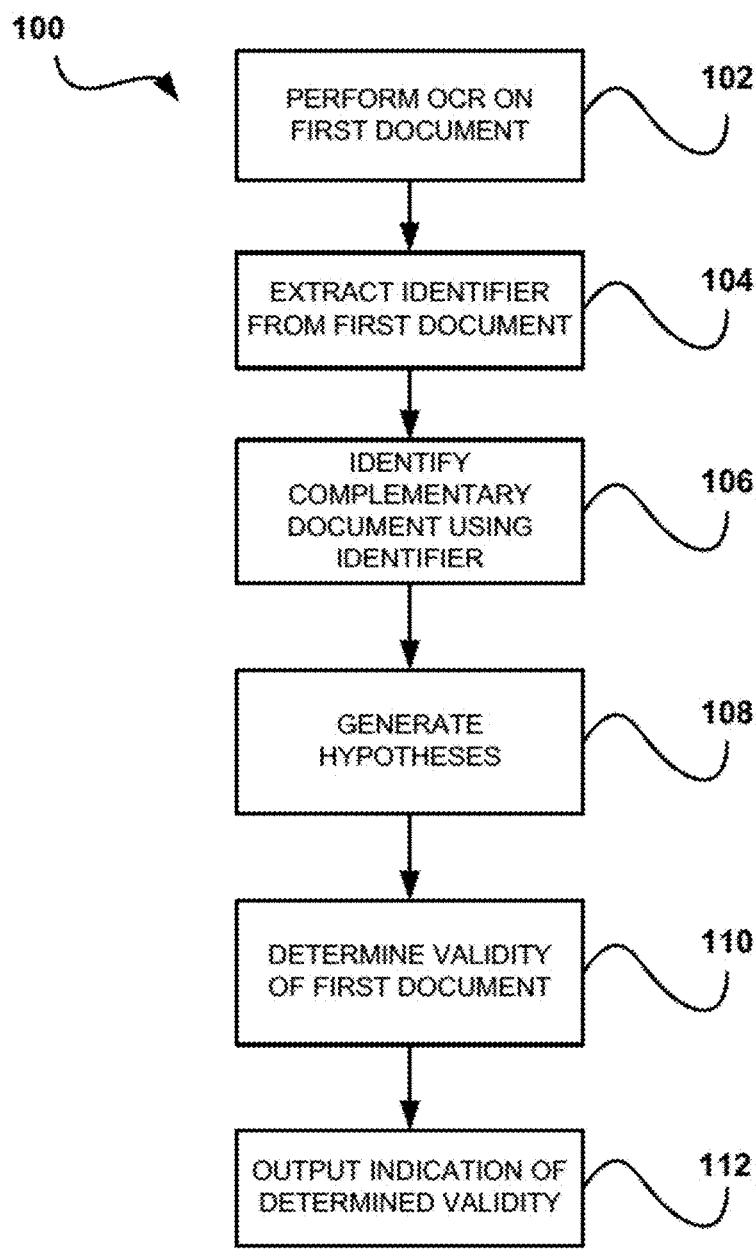
FIG. 1 is a method for determining document validity in accordance with one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

It must also be noted that, as used in the specification and the appended claims, the singular forms "a," "an" and "the" include plural referents unless otherwise specified.

In one general embodiment, a method includes: receiving an image of a tender document; performing optical character recognition (OCR) on the image; extracting an identifier of the tender document from the image based at least in part on the OCR; comparing the extracted identifier with content from one or more data sources; requesting complementary information from at least one of the one or more data sources based at least in part on the extracted identifier; receiving the complementary information; and outputting at least some of the complementary information for display on a mobile device.

In another general embodiment, a system includes: logic in and/or executable by the processor and configured to cause the processor to: receive an image of a tender document; perform optical character recognition (OCR) on the image; extract an identifier of the tender document from the image based at least in part on the OCR; compare the extracted identifier with content from one or more data sources; request complementary information from at least one of the one or more data sources based at least in part on the extracted identifier; receive the complementary information; and output at least some of the complementary information for display on a mobile device.

In still another general embodiment, a computer program product includes: a computer readable storage medium having embodied thereon non-transitory computer readable instructions, the computer readable instructions being configured to cause a processor to: receive an image of a tender document; perform optical character recognition (OCR) on the image; extract an identifier of the tender document from the image based at least in part on the OCR; compare the extracted identifier with content from one or more data sources; request complementary information from at least one of the one or more data sources based at least in part on the extracted identifier, receive the complementary information; and output at least some of the complementary information for display on a mobile device.

The receiving party, in one approach, has to validate the content of the received document by comparing the document's content with its view of the transaction, which in most cases is stored electronically in a database; i.e., the receiver has to retrieve or extract the information from the received document and compare it to the corresponding information stored in its database. This, for example, can be achieved by a human reading the document, encoding its data, and comparing it to the corresponding content of the receiver's database. The extraction of the information can be, at least to some extent, automated by utilizing technologies that automatically extract the relevant information from the document.

Today many documents still are received on paper and are built for human readability. The layout and the forms of the documents differ vastly between senders and are loosely structured, making the automatic extraction and recognition of the relevant information using prior art methods very challenging and inaccurate. One way of extracting the information from a piece of paper is by the use of a program that first transforms the paper image into text, then navigates through the text and performs the extraction of the needed fields. The most advanced of these programs look for special features of the text or image to locate the relevant information. This requires significant knowledge of the document structure and the document language.

To finalize the validation, the extracted data are passed on to a person or a program that compares the extracted data with the content of the receiver database, corrects the errors, and validates the transaction. In order to achieve an effective automatic comparison of the extracted data to the content of the database, one has to first resolve semantic differences between the sender's and the receiver's language. There often exist many subtle differences in language, making direct and hence automatic comparisons ineffective. For example, the sender and the receiver might use different units resulting in different values that cannot be directly compared. Thus, data normalization that translates the sender's language to the receiver's language in his database has to occur prior to the automatic comparison to achieve a satisfactory automation rate.

An alternative process to validate business transactions is to utilize an electronic data interchange (EDI) which allows a direct, i.e. automatic, comparison and, thus, validation, of the transaction as understood by the parties involved without having to extract or to normalize the data. EDI achieves this level of automation by solving up-front the data normalization problem through the use of standardized document forms for the information exchange. The set-up of these forms is time- and cost-intensive, resulting in a process that does not adapt easily to a changing environment.

In one embodiment, an automatic business transaction validation process allows an automatic transaction validation level that comes close to EDI without the need of manually defining standardized document forms. This is achieved by going beyond the sequential process of information extraction, followed by data normalization and then comparison to the receiver's database as described above. The new process utilizes all information available simultaneously to validate the transaction. The different sources of information are the received document, the receiver's expectation of the transaction as stored in his database, and business rules pertaining to the specific transaction. The new process simultaneously analyzes the information from these sources and uses the complementary information to validate the interaction.

Specifically, it allows to automatically correct extraction and OCR errors as well as to automatically normalize the data yielding a highly efficient comparison of the received document to the receiver's database and, thus, results in an efficient automatic validation of the transaction. In addition, over time the process is able to learn data formatting specific to a sender, which in turn improves the level of automatic transaction validation for this specific sender. In summary, the new process allows out of the box automatic transaction validation independent of the source of the received documents (paper or electronic). Over time the process allows to automatically build highly specific data normalization for each receiver. In essence the new process generates automatically the standardized document form used by EDI on the receiver side.

In one embodiment, a paper invoice validation process includes the following steps. First, a paper invoice is scanned. Next, Optical Character Recognition (OCR) is applied to the scanned invoice. Additionally, information is extracted from the invoice. Examples of extracted invoice-header information are invoice-number, total amount charged, name and address of sender. Extracted information may also include an address which may not necessarily be a sender's address, but instead an address relating to a sender, for example an address of a sender's agent responsible for dispatching documents, an address of an intermediate recipient of the document (e.g. a courier or other mail handling facility, professional, or service, etc.), or any address that may be associated with a sender's address, for example an address associated with a sender's address in a relational database, in various approaches. The extraction of line item information like quantity, description, unit price, and total charge of line item is difficult to perform effectively and reliably. Accordingly, line item extraction may often be skipped.

Further, the extracted information is manually validated. If necessary, OCR errors and the labels assigned by the extractor to specific fields are corrected. For example, it is determined whether the number identified by the extractor to be the purchase order number is actually the customer number. Further still, the content of extracted information is validated by matching against the purchase order. For example, the total amount charged as extracted from the invoice may be matched to the total amount ordered in the purchase order. Also, the invoice is validated by checking validated information against invoice validation rules.

However, several challenges arise with this process. First, the set-up of an effective and reliable automatic extraction system is time intensive. Especially, as mentioned above, the extraction of line items is difficult. Automatic systems for line item extraction often rely on template-extraction, with the need of having a custom-built template for every vendor. Yet the information held by the line items is important to validate the invoice.

Additionally, for the validation of the invoice, a large portion of the extracted information may be irrelevant. Given the described process, the knowledge of which information is important for invoice validation and which information can be disregarded is not available to the operator responsible for validating the extracted information. As a result, the operator often validates and corrects more information than is actually needed. Further, manual validation of the content is time intensive. Automated validation of the content requires a set-up process in order to handle semantic differences between the invoice and the purchase order information. For example, the units might differ between the invoice and the purchase order. In short, one may have to normalize the invoice data in order to achieve an effective automated matching. The set-up of the data normalization is time and labor-intensive. For every supplier specific data normalization is required. Similarly, description of the ordered goods can vary substantially between the invoice and the purchase order. For example, a ninety degree connection pipe might be described as an elbow-connection pipe on the invoice and a right angle connection pipe on the purchase order.

The result of these challenges and problems is that automatic invoice validation is often ineffective and only applicable to a small portion of the incoming invoices, especially when also line item information is needed for the invoice validation. One can further improve the process by using electronic invoices, which effectively eliminate the first two challenges described above. For electronic invoices the data normalization step remains for automated content validation.

One disadvantage of the above invoice validation process is its sequential nature that processes one source of information at a time independent from the other sources of available information. For example, given a scanned paper invoice, the OCR step tries to find the most likely character sequence given the input of scanned pixels. The OCR step does not take into account the information from extraction and the information from validating the extracted content by matching to the purchase order. Obviously, this additional information constrains the possible character sequences and can therefore improve the OCR step. Business rules are another source of additional information that can benefit the OCR step, the extraction step, as well as the data normalization step. For invoices, an exemplary business rule is that the total price of a line item should be equal to the quantity delivered of the line item times the unit price. By utilizing this information in the validation through matching steps, one can, for example, disambiguate unit differences between the invoice and the purchase order. These are just a few out of many examples that illustrate the advantage of simultaneously leveraging additional information in the validation process.

In contrast to the aforementioned process, the invoice validation process detailed below leverages several or all available sources of information simultaneously to determine the invoice's validity. In general, the sources of available information include the invoice itself, the corresponding purchase order, delivery notes, and business rules. The invoice validation process takes the information from OCR, extraction, validation of the extracted content by matching to the purchase order, and business rules. It evaluates the hypotheses allowed under the combined constraints of the given information and as a result gives a confidence score that indicates the validity of the invoice. In addition, the process also flags potential problems. For example, line items on the invoice that do not match to any position in the purchase order, under delivery, over delivery, price differences between the invoice and the purchase order, and so forth.

FIG. 1 shows a method 100 for determining document validity. It should be noted that the method 100 may be carried out in any desired environment.

As shown in operation 102, optical character recognition (OCR) is performed on a scanned image of a first document, which may be a paper document used as part of an overall transaction. The first document may include any physical representation of handwritten, typewritten or printed text. For example, the first document may include an invoice, a receipt, a bill, a sales order document, an insurance claim document, etc. In another example, the first document may include an explanation of benefits document, a medical insurance document, etc.

Additionally, in one embodiment, the scanned image may be generated by scanning the first document. For example, the document may be scanned using a personal or commercial hardware scanning device, using scanning software, etc.

Further, the scanned image may include any image that results from the scanning of a document. For example, the scanned image may include a JPEG image, a bitmap image, a TIFF image, a RAW image, etc. Of course, however, the scanned image may include any image type. Additionally, in the context of the current embodiment, optical character recognition may include any mechanical or electronic translation of the scanned image into machine-editable text.

It should be noted that the OCR step above may not need to be performed in particular circumstances. For example, in one instance, then first document may include an electronic document.

Additionally, as shown in operation 104, an identifier is extracted from the first document. In the context of the current embodiment, the identifier may include any aspect of the first document that can be used for purposes of identification. For example, the identifier may include a purchase order number, a heading of a document, a title of a document, a file name of an OCRed version of a document, etc. In one embodiment, the identifier may be extracted from the scanned and OCRed version of the first document.

In another embodiment, the identifier may be extracted from the first document by scanning one or more portions of the first document. In still another embodiment, the identifier may be extracted simultaneously with the OCRing of the document. In yet another embodiment, the identifier may be manually extracted. Of course, however, the identifier may be extracted from the first document in any manner.

Moreover, in an alternate approach, rather than extracting an identifier from the first document, the identifier may be obtained and/or input from some other source, e.g., from a user who inputs the identifier; from scanning a bar code on the first document; from a file name of the electronic image of the first document; etc.

An additional aspect of the presently disclosed inventive concepts may include utilizing data other than those data extracted from the document as the identifier. For example, in one approach the identifier may be the entire image of the document, e.g. raw image data "as-captured" using the capture device, or an entire image having been subjected to an extraneous processing operation, such as cropping to remove background, illumination correction (e.g. gamma balancing or adjustment), color depth reduction or conversion (e.g. converting a color image to grayscale or from one color coding scheme (e.g. RGB) to another (e.g. CMYK), etc. as would be understood by one having ordinary skill in the art upon reading the present descriptions.

A still further additional aspect of the presently disclosed techniques includes utilizing as the identifier an entirety of textual information identified and/or extracted from the document (e.g. via OCR). This exemplary approach may be particularly advantageous in embodiments subsequently employing fuzzy matching to validate a document, as described in further detail below. For example, in one embodiment utilizing an entirety of the textual information identified in the first document may be advantageous because the fuzzy matching process is provided more data from which to characterize and/or validate the document, enabling a more robust analysis of the content (e.g. textual information per se) and/or context of the document (e.g. the intended origin of the document, intended destination of the document, intended purpose of the document, etc. as would be understood by one having ordinary skill in the art upon reading the present descriptions).

Further, as shown in operation 106, a complementary document (or documents) associated with the first document is identified using the identifier. In the context of the current disclosures, the complementary document may include any document that is related in some way to the first document. For example, the complementary document may include at least one of a purchase order, a memorandum, a delivery note, etc. In another embodiment, the complementary document may have a relationship with the first document. For example, the complementary document may include a purchase order related to the first document, where the first document is an invoice.

In another embodiment, the complementary document may be identified by comparing the identifier against a database, repository, etc. For example, a purchase order may be identified by comparing a purchase order number against a purchase order repository. In yet another embodiment, the complementary document may be retrieved. For example, the complementary document may be retrieved from the database, repository, etc.

Also, as an option, the identifier may be additionally determined using an additional document that links the first document to the complementary document. For example, a vendor identifier may be extracted from an additional document that links a list of open purchase order numbers with identifiers of vendors.

Further still, as shown in operation 108, a list of hypotheses mapping the first document to the complementary document are generated using textual information from the first document, textual information from the complementary document, and predefined business rules. In one embodiment, the textual information from the first document and from the complementary document may include numerical information, text, a symbol, etc. For example, the textual information may include a description of goods, a line item, a header field item, a unit price, a quantity of goods, an extended price, etc.

In another embodiment, some textual information may be missing from the first document. For example, there may have been an error with OCRing. In response, columns of the first document may be validated in order to fill in any gaps, and operations such as a square balance may be performed in order to obtain correct textual information from the first document.

In yet another embodiment, a term on the first document may be correlated to a different term on the complementary document as referring to a same thing. For example, different entities, such as suppliers, customers, etc., may use a different description or different language for descriptions of products, units of measure, etc. In another embodiment, a closest match may be determined for the term on the first document if no direct correlation can be found. Additionally, the correlation of the terms may be stored in a database. For example, a translation database may be constructed on-the-fly during the generation of the list of hypotheses for later use.

In addition, the list of hypotheses may be generated using non-textual information from the first document and the complementary document, such as lines, colors, etc. Further, the list of hypotheses may be generated using location information from the first document and the complementary document. For example, the location information may include a location of textual information within the first document or complementary document. This location information may assist in generating the list of hypotheses. For example, the location of textual information that is known to be correct may be used to determine whether an error exists with other textual information.

In another embodiment, the hypotheses may include any correspondence between one or more items of textual information of the first document and the corresponding document. For example, the hypotheses may include a match between textual information from the first document and textual information from the corresponding document. Further, the predefined business rules may include any predetermined rules relating to a business. In one embodiment, the predefined business rules may relate to the first document or the complementary document. For example, the predefined business rules may include a rule that a total price of a line item is equal to a quantity multiplied by a unit price. In another example, the predefined business rules may include a rule that all line items have to equal a subtotal of the first document.

In addition, an expectation or other constraints may be used in the generation of the list of hypotheses. For example, an expectation from an ERP system disclosing that a particular amount of a certain product is to be expected may be used.

In one exemplary embodiment, any fields that potentially match between the first document and the complementary document are selected as potential fields for generating hypotheses. Additionally, a single field may have multiple potential corresponding hypotheses. Once all potentially matching fields have been determined, a structure of the first document and/or the complementary document is determined and the fields are grouped into logical order. For example, the fields may be grouped in a "nearest neighbor" manner. In another example, the fields may be grouped as a description, a quality, a price, a total, etc. Further, the predefined business rules are then used to confirm the validity of the fields. For example, a predefined business rule may confirm that an individual amount field multiplied by an individual cost field equals a total cost field. In this way, accurate hypotheses may be generated using little reconstruction or extraction.

In another exemplary embodiment, extraction is run over the OCRed version of the first document in order to provide textual information as well as an initial idea about each field. After an analysis utilizing the extracted textual information, the predefined business rules, and the complementary document, the extracted textual information is altered. For example, numbers, letters, and other field items are altered according to information obtained from the predefined business rules and the complementary document. After the alteration has occurred, an additional analysis is performed utilizing the altered extracted textual information, the predefined business rules, and the complementary document. In this way, the extracted textual information may be fine-tuned to more accurately relate to the complementary document.

In yet another exemplary embodiment, extraction is run over the OCRed version of the first document in order to identify all lines and groups of lines representative of line items. Additionally, a cross-correlation is performed between the complementary document and the extracted textual information from the first document. Further, the first document is reconstructed using the cross-correlation.

In another embodiment, OCR errors in the first document may be corrected using at least one of the textual information from the complementary document and the predefined business rules. Additionally, in another embodiment, data from the first document may be normalized using at least one of the textual information from the complementary document and the predefined business rules. Further, in yet another embodiment, data from the complementary document may be normalized using at least one of the textual information from the first document and the predefined business rules. For example, normalization may include converting grams to kilograms, ounces to grams, dollars to euro, etc.

In addition, as shown in operation 110, a validity of the first document is determined based on the hypotheses. In the context of the current embodiment, the validity may include an indication of whether the first document is sufficiently related to the complementary document. For example, the validity may include an indication that the first document matches the complementary document. Additionally, the validity may be determined by analyzing the hypotheses. In another embodiment, the determination may be additionally based on a confidence level of the hypotheses.

Further, in one embodiment, an alert may be generated upon encountering a potential problem when determining the validity of the first document. For example, the alert may include an identification of a mismatch in expected similar or identical values in the first and complementary documents. Additionally, in another embodiment, user input may be received indicating at least one of a correction and a validation of items such as a line item, header field item, etc. of the first document.

Further still, in another embodiment, determining the validity of the first document may include automatically estimating values for expected or actual line items, header field items, etc. in the first document. Also, determining the validity of the first document may include automatically correcting values for expected or actual line items, header field items, etc. in the first document based on at least one of the textual information from the complementary document and the business rules. In yet another embodiment, the first document may be reconstructed using the hypotheses and business rules, wherein the determining the validity step analyzes the reconstructed first document. As an option, determining the validity of the first document may include globally validating the textual information from the first document. For example, each line item of an invoice may be globally validated.

In still another embodiment, upon determining that the first document is valid, knowledge may be generated based on the hypotheses generated. For example, the generating the knowledge may include using transduction. Any transductive method known in the art can be used. Several transductive methods which may be used in various embodiments are set forth in U.S. Patent Application Pub. No. US 2008-0097936 A1 to Schmidtler et al., filed May 23, 2007, and which is herein incorporated by reference.

In one exemplary embodiment, once extracted textual information from the first document has been later verified by an individual, or the extracted textual information has been verified by a computer by the determination of a perfect match, the verification is sent to the extractor. In this way, the extractor "learns" from the verified information and can apply the verified information to future extraction and analysis.

Furthermore, as shown in operation 112, an indication of the determined validity is output. The output indication may include text, an image, a sound, or any other indication representative of the determined validity. For example, the indication may be output to a graphical display device, etc. Moreover, the indication may be output to, and stored on, a storage medium, e.g., of a type known in the art, such as RAM, ROM, hard drive, etc. In this way, the first document may be validated straight through, in most instances without human intervention, and with accurate knowledge of what is not valid in the first document. Additionally, in one embodiment, the determined validity may be used to validate a business transaction.

Additionally, a reconciliation screen may be output to a user upon failing to determine that the first document is valid or determining that the first document is invalid. For example, if one or more errors in the first document result in an unresolvable match with the complementary document, the errors are represented in the reconciliation screen, where a human operator (for example, an employee of the customer or the supplier) may view the errors and correct the first document in order to assist in the determination of the validity of the first document. The human operation may be notified via a message, e.g. an electronic mail message, that unresolvable errors exist with the first document. After human correction has been performed, the method may then be repeated on the corrected first document.

In another embodiment, a notification to access the reconciliation screen may be sent to a sender of the first document. Further, a modification to the first document may be received by a user viewing the reconciliation screen. Further still, re-validation of the modified first document may be attempted.

The methodology presented herein may be repeated for sequential documents, which may or may not relate to the same transaction. For example, assume that a second document is part of the same transaction as a first document. After determining the validity of the first document, the validity of a second document may be determined using the original complementary document again, and/or using the first document as the complementary document. Thus, an illustrative sequence may be to run the method of FIG. 1 to validate the first document, then perform OCR on a scanned image of a second document, and extract an identifier from the second document. A second complementary document associated with the second document is identified. As noted above, the second complementary document may be the same as that used to validate the first document, and/or the validated first document may be used as the second complementary document. In another approach, the second complementary document is some other document altogether. A list of hypotheses mapping the second document to the second complementary document is generated using: textual information from the second document, textual information from the second complementary document, and predefined business rules. A validity of the second document is determined based on the hypotheses, and an indication of the determined validity of the second document is output.

In one example, the first document may be an invoice, the validity of which is determined using an associated purchase order as the complementary document. The associated proof of delivery is also to be validated. However, assume it is difficult to validate the proof of delivery against the purchase order due to variations in the way quantities, costs, etc. are shown on the two documents. Once the invoice has been validated, it may be used as the complementary document to validate the proof of delivery.

Along a similar line, the general method may be performed to again attempt to determine the validity the first document, except this time a different complementary document is used. This approach may be useful for providing a higher confidence of the validity of the first document by providing two or more determinations of validity. This approach may also be used when a first attempt at validating the document fails.

Figure 2:
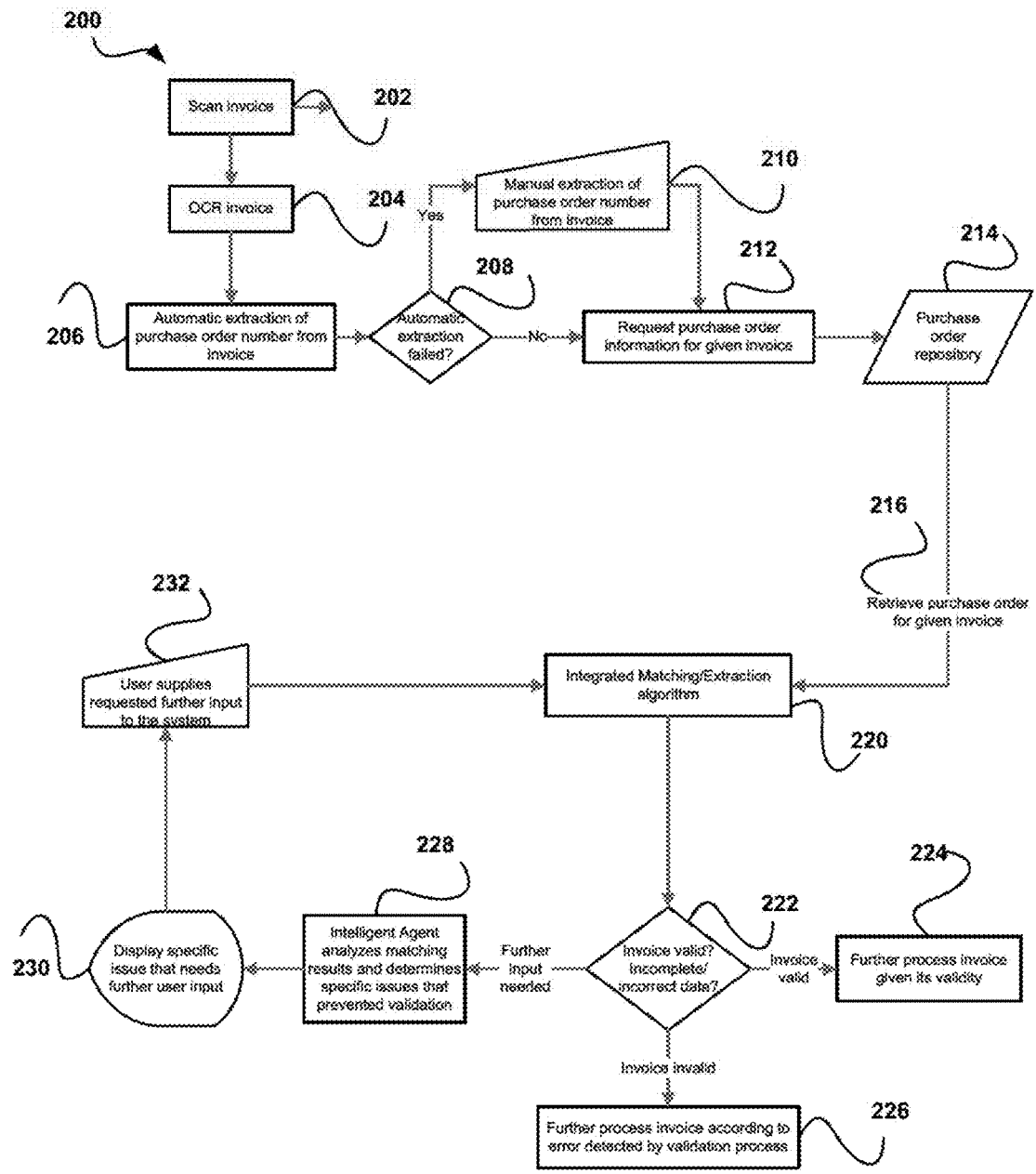
FIG. 2 is a method for determining a validity of an invoice in accordance with one embodiment of the present invention.

FIG. 2 shows a method 200 for determining a validity of an invoice, in accordance with another embodiment. As an option, the method 200 may be carried out in the context of the architecture and environment of FIG. 1. Of course, however, the method 200 may be carried out in any desired environment.

As shown in operation 202, an invoice is scanned. Additionally, in operation 204 the scanned invoice is OCRed. Further, in operation 206 an attempt is made to extract a purchase order number and/or a seller address from the invoice. In one embodiment, the extraction may be for purposes of identifying a purchase order corresponding to the invoice. In another embodiment, the extraction may be performed by a simple extractor.

In operation 208, it is determined whether the automatic extraction has failed. If it has, in operation 210 the purchase order number and/or the seller address are manually extracted from the invoice.

Additionally, if in operation 208 it is determined that the automatic extraction has not failed, in operation 212 purchase order information is requested for the given invoice from a purchase order repository 214. For example, the purchase order information may be requested from an ERP system.

Further, in operation 216 the purchase order for the given invoice is retrieved from the purchase order repository 214. In on embodiment, a set of purchase orders may be retrieved for the given invoice.

Also, the purchase order for the given invoice retrieved in operation 216 as well as the scanned and OCRed invoice are processed utilizing an integrated matching and extraction algorithm 220 which performs integrated iterative invoice validation. In one embodiment, line item information may be automatically identified and validated from the scanned and OCRed invoice by the integrated matching and extraction algorithm 220. For example, unit price, quantity, description of line item, and line item price, in addition to a subtotal charge, a tax charge, a shipping and handling charge, and a total price may be automatically identified and validated from the invoice. In another example, a statistical extractor may be run over the invoice. The statistical extractor may provide information about extracted data such as the unit price, quantity, description, line item price, etc.

In addition, it is determined by the integrated matching and extraction algorithm 220 in operation 222 whether the invoice is valid. For example, it may be determined whether the invoice contains incomplete or incorrect data. If it is determined in operation 222 that the invoice is valid, then in operation 224 the invoice is further processed given its validity. If it is determined in operation 222 that the invoice is invalid, then in operation 226 the invoice is further processed according to one or more errors detected by the validation process.

However, if it is determined in operation 222 that further input is needed, in operation 228, an intelligent agent analyzes any matching results and determines specific issues that prevented validation. Additionally, in operation 230 specific issues resulting from the analysis by the intelligent agent in operation 228 that need further input from a user are displayed. Further, in operation 232 the user supplies any requested further input, and this further input is in turn processed utilizing the integrated matching and extraction algorithm 220 along with the information extracted in operation 220 and the purchase order for the given invoice retrieved in operation 216.

For example, in the event that the invoice cannot be automatically validated, the system may request additional information from the user by prompting the user to correct and validate OCRed data and extraction results for specific fields on the invoice that prevented the automatic validation of the invoice. The corrected and validated information may then be fed back to the integrated matching and extraction algorithm 220 in order to reevaluate the validity of the invoice given the additional information. As an option, this process may be reiterated until the invoice is either validated or a serious problem with the invoice has been identified that makes the invoice invalid.

In another example, the system may automatically identify with high accuracy specific information on the invoice that prevents automatic validation. This may be achieved by the intelligent agent which analyzes matching hypotheses utilizing business rules. The intelligent agent may minimize the necessary input, which may result in highly efficient manual validation and correction.

As a result, the above method 200 offers many advantages when compared to other invoice validation approaches. For example, the above method 200 may provide zero set-up, and may allow for a substantially larger number of invoices that can be processed straight through without any human intervention. Additionally, the above method 200 may provide for accelerated manual validation and correction of OCR and extraction results, as well as an efficient identification of invalid invoices. In this way, it may be determined whether circumstances such as underdelivery, overdelivery, and overpricing are occurring based on one or more invoices without the need for a specialized employee to search or analyze such invoices.

Further, the above method 200 may provide for the simultaneous use of different sources of available information. By utilizing the knowledge from extraction, comparing it to the expectation of the purchase order, and checking against the applicable business rules, the above method 200 may yield improved extraction accuracy. In particular, line item extraction accuracy may be substantially improved. Further still, the above method 200 may provide for automatic OCR error correction as well as automatic data normalization. Also, since the above method 200 is an integrated process, any improvements may feed on each other. For example, improved OCR may result in improved extraction, which in turn may yield better matching, and so forth.

Figure 3:
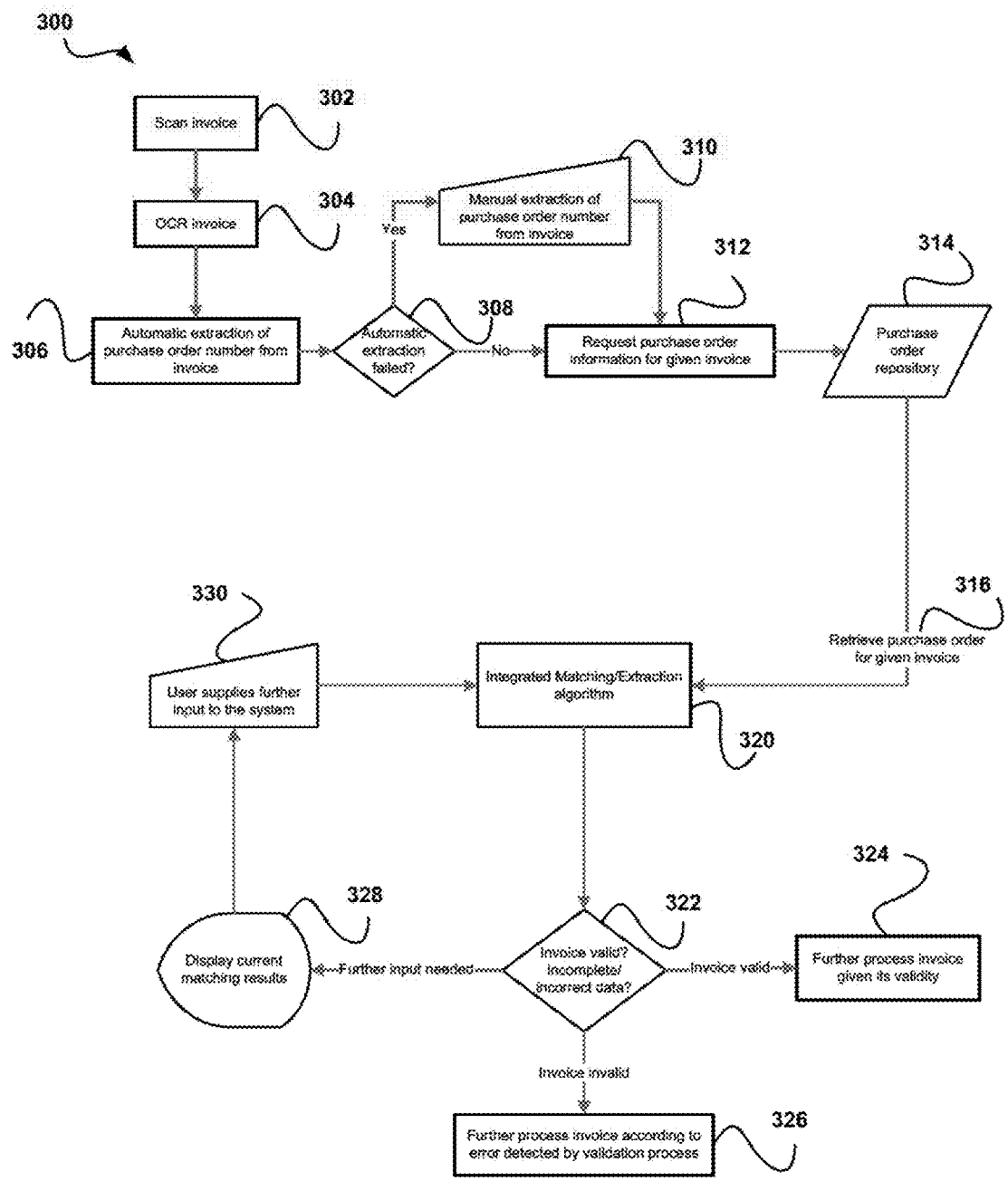
FIG. 3 illustrates a method for determining a validity of an invoice without the use of an intelligent agent in accordance with one embodiment of the present invention.

FIG. 3 shows a method 300 for determining a validity of an invoice without the use of an intelligent agent, in accordance with yet another embodiment. As an option, the method 300 may be carried out in the context of the architecture and environment of FIGS. 1 and/or 2. Of course, however, the method 300 may be carried out in any desired environment.

As shown in operation 302, an invoice is scanned. Additionally, in operation 304 the scanned invoice is OCRed. Further, in operation 306 an attempt is made to extract a purchase order number and/or a seller address from the invoice. In operation 308, it is determined whether the automatic extraction has failed. If it has, in operation 310 the purchase order number and/or the seller address are manually extracted from the invoice.

Additionally, if in operation 308 it is determined that the automatic extraction has not failed, in operation 312 purchase order information is requested for the given invoice from a purchase order repository 314. For example, the purchase order information may be requested from an ERP system.

Further, in operation 316 the purchase order for the given invoice is retrieved from the purchase order repository 314. In on embodiment, a set of purchase orders may be retrieved for the given invoice.

Also, the scanned and OCRed invoice, as well as the purchase order for the given invoice retrieved in operation 316, are processed utilizing an integrated matching and extraction algorithm 320 which performs integrated iterative invoice validation. In addition, it is determined by the integrated matching and extraction algorithm 320 in operation 322 whether the invoice is valid. For example, it may be determined whether the invoice contains incomplete or incorrect data.

If it is determined in operation 322 that the invoice is valid, then in operation 324 the invoice is further processed given its validity. If it is determined in operation 322 that the invoice is invalid, then in operation 326 the invoice is further processed according to one or more errors detected by the validation process.

However, if it is determined in operation 322 that further input is needed, in operation 328, current matching results are displayed. Additionally, in operation 330 a user supplies further input into the system, and this further input is in turn processed utilizing the integrated matching and extraction algorithm 320 along with the information extracted in operation 320 and the purchase order for the given invoice retrieved in operation 316.

In one embodiment, the validity of the invoice may be determined by simultaneously leveraging information from OCR, information from extraction, matching to a purchase order, business rules, and potentially manually validated information. An example of an algorithm used for this integrated matching process is described in the embodiment below.

In the context of the current embodiment, a position includes a purchase order position, an invoice line includes a physical line on an invoice, and a line-item includes a description of a specific good delivered and the corresponding charges. Additionally, a line-item field includes a component of a line-item with a particular meaning, for example, description of the goods delivered, unit price, quantity and/or extended price. Further, the description includes the specific line-item field that describes the goods delivered. Also, a position match candidate (PMC) includes a combination of line-items that is a candidate to match to a purchase order position. In one embodiment, PMCs may map one to one to positions, whereas line-items do not necessarily have a one to one mapping to positions.

The matching and extraction algorithm validates invoices by comparing the information given on an invoice with the corresponding purchase order. To this end the algorithm performs the following tasks. First, the algorithm validates line-items by associating the line-items on a given invoice with the open purchase order positions of this invoice. Additionally, the algorithm validates the invoice by checking the consistency of the invoice given the extracted values for total, subtotal, taxes as well as other additional charges like shipping and handling against the sum of the validated line-items. Further, the algorithm outputs a score that indicates the validity of the invoice as well as the best association as determined by the algorithm of the line-items and their fields to the purchase order positions.

The algorithm generates a list of matching hypotheses. In one example, a matching hypothesis is a possible association of the line-items and their respective fields to the list of open purchase order positions as well as possible values for total, subtotal, tax and other additional charges necessary to validate the invoice. The algorithm determines for each of the generated hypotheses an overall cost of the association and validation. The hypothesis with the lowest cost is elected as the final result.

The cost may be based on different sources of information. For example, the algorithm may utilize OCR results and a confidence of characters. Additionally, the algorithm may utilize extractor results, e.g. a list of possible label assignments and the associated confidences for every token on the invoice. Further, the algorithm may utilize user provided input such as correction of OCR and extraction results, as well as purchase order information and business rules.

Matching hypotheses are generated in a two-step process. The first step forms a set of PMCs from the invoice line-items. However, a complicating factor here is that line-items may not necessarily map one to one to positions. On occasion, several line-items may map to the same position. Additionally, in one embodiment, several positions may map to the same line-item. Accordingly, the algorithm generates PMCs by combining line-items given the extraction and OCR results. Additionally, in yet another embodiment, line item match candidates (LIMCs) may be created from the set of positions in order to handle the case where several positions map to the same line item.

The second step finalizes the creation of the matching hypothesis by electing a specific one to one mapping of the generated PMC set to the positions and the resulting validation. In another approach, a specific one to one mapping of the generated LIMC set to the line items is selected. In yet another approach, a combination of the foregoing may be used.

For simplicity, the following will refer to PMCs, though it is to be understood that similar methodology may be applied to use of LIMCs and/or the combination of PMCs and LIMCs. The overall cost c of the matching hypothesis is the sum of the individual costs of the two steps, as shown in Table 1.

TABLE 1

| c = cPMC + cMAP |
| --- |

As shown in Table 1, cPMC indicates the cost of generating a specific set of PMCs and cMAP is the cost associated with a specific one to one mapping of the generated PMC set to positions and the validation of the invoice. The cost cPMC is factored into the following sum, as shown in Table 2.

TABLE 2 cPMC = cprior + cline + cextraction + cOCR + csequence + calignment

The different costs cprior, cextraction, cOCR, csequence, calignment and cline are defined as shown in Table 3.

TABLE 3

| | |
|---|---|
| cprior: | Cost associated with a specific combination of line-items. It is a heuristic cost containing prior knowledge regarding the combination of line-items. For example the combination of line-items that appear in consecutive order on the invoice is preferred over the combination of nonconsecutive line-items. |
| cline: | The logarithmic sum of the probabilities of the line-items used for the current PMC set to be line-items versus generic invoice lines. The probabilities are based on the different format of line-items compared to generic invoice lines. |
| cextraction: | The logarithmic sum of extraction probabilities of the tokens that have been assigned the labels description, quantity, unit price and extended price for the current PMC set. |
| cOCR: | The tokens assigned the labels quantity, unit price and extended price by the current PMC set have to fulfill the constraint that quantity times unit price equals extended price. The cost cOCR is the cost associated with fulfilling this algebraic constraint given the OCR confidences of the different characters in these tokens. |
| csequence: | This cost captures the prior knowledge that some sequences of line-item fields are more likely than others. For example it is unlikely to observe on an invoice that extended price is the first line-item field on a line-item followed by unit price, quantity and finally description, whereas the sequence description, quantity, unit price and extended price is quite common for a line-item. |
| calignment: | Cost that reflects fee observation that line-item fields tend to be aligned vertically |

The mapping cost cMAP of the second step is shown in Table 4.

TABLE 4 cMAP = cmatch + cvalid

The variable cmatch represents the total cost of the one to one mapping of the current PMC set to the positions. It is the sum over the individual matching costs of matching a single PMC to a position. The single matching costs are derived from the cost of fuzzy matching the individual line-item fields description, quantity, unit price, and extended price to the corresponding entries in the position. The fuzzy matching takes into account the OCR confidence of the individual characters in the extracted line-item fields.

The variable cvalid represents the cost that determines the validity of the invoice given the elected one to one mapping of the current PMC set to positions and checking this information against additional information extracted from the invoice according to predefined business rules. For example, the default business rule may be that the sum of the extended prices of the current PMC set balances with the extracted values for invoice subtotal, invoice total, tax, and additional extracted charges like shipping and handling. The cost may be based on the extraction probabilities of the extracted values and the associated OCR confidences of the individual characters.

The number of matching hypotheses grows in a factorial manner depending on the number of line-items as well as positions. Accordingly, an exhaustive search for the best matching hypothesis becomes quickly unpractical for invoices with more than a dozen of line-items and positions when using prior art methods. The developed algorithm approximates the search efficiently and effectively. The elected approach is described in the following paragraphs.

The number of possible PMC sets is factorial in the number of line-items. Similarly, the number of possible one to one mappings to positions given a specific PMC set is factorial in the number of positions and line-items. Accordingly, the number of resulting possible matching hypotheses is a factorial number of PMC sets combined with an factorial number of mappings making, as mentioned above, an exhaustive search of the matching hypothesis space unpractical using prior art methods.

Searching the PMC set space independently from the mapping space would reduce the complexity of the search. However, this approach yields suboptimal associations of line-items to positions. It applies too severe restrictions on the matching hypothesis search space leading to local optima. An illustrative example is an invoice with a rarely observed layout of line-items. In this instance the best guess for extracted line-item fields is likely to be systematically wrong. Still, the additional costs in cPMC do not sufficiently constrain the problem to overcome the wrong extraction results and, thus, ultimately yield a wrong association of line-items to positions. In this case, the simultaneous analysis of the information contained in the mapping cost cMAP is necessary to resolve the problem.

The elected algorithm searches the PMC set space and the mapping space simultaneously. It copes with the combinatorial growth of the search space given the number of line-items and positions by leveraging a priori knowledge of the specific problem. For example, an exhaustive search of all possible mappings given a specific PMC set is unnecessary. At that point the problem is sufficiently constrained and a greedy search for the best mapping is sufficient. On the other hand a greedy search for the best PMC set tends to yield a suboptimal association of line-items to positions. The final strategy adopted for the search is to apply a restricted combinatorial search of the PMC set space and to combine it with a greedy search for the best mapping given a specific PMC set. The algorithm uses stochastic annealing for the restricted combinatorial search of the PMC set space.

TABLE 5

Algorithm 1 Matching algorithm to find the best association of line-items to purchase order positions.

Require: Positions P for given invoice.
Require: Invoice I, I contains the tokens of the invoice together with their (x, y) positions as well as their corresponding OCR and extraction results.
1: I := updateInvoice(I) {Depending on additional external input update information contained in I. For example user provided validation or correction of line-item fields and OCR results.}
2: (M, setOfPMCs, $c_{MAP}$, $c_{PMC}$) := initializeMatchingHypothesis(P, I) {The procedure initializeMatchingHypothesis elects an initial set of PMCs setOfPMCs and determines its best mapping M to positions. It returns the initial matching hypothesis (M, setOfPMCs) and its cost $c_{PMC}$ and $c_{MAP}$.}
3: bestMatch := (M, setOfPMCs) {Current best association of line-items to positions.}
4: minCost := $c_{PMC}$ + $c_{MAP}$ {Current best cost associated with bestMatch.}
5: while minCost improves sufficiently do
6:    ($c_{PMC}$, setOfPMCs) := nextPMC($c_{PMC}$, setOfPMCs, I) {Generate next PMC set and its cost using stochastic annealing.}
7:    ($c_{MAP}$, M) := findMap(setOfPMCs) {Find best mapping M for setOfPMCs and its cost $c_{MAP}$ using greedy search.}

TABLE 5-continued

Algorithm 1 Matching algorithm to find the best association of line-items to purchase order positions.

8:  c := $c_{PMC}$ + $c_{MAP}$ {Overall cost c of current matching hypothesis given by setOfPMCs and M.}
9:  if c < minCost then
10:    minCost := c
11:    bestMatch := (M, setOfPMCs)
12:  end if
13:  updateAnnealingSchedule( ) {Procedure that monitors the changes in the individual costs that constitute the cost $c_{PMC}$ and their relation with the overall cost c. It updates the annealing schedules needed in the routine nextPMC accordingly.}
14: end while Table 5 describes the aforementioned process in more detail. It starts with a matching hypothesis by generating an initial PMC set and associating the individual PMCs greedily to positions. The main loop of the algorithm tries to improve on the initial matching hypothesis by iterating through the matching hypothesis space. Within each iteration of the main loop the algorithm chooses a PMC set using stochastic annealing and determines its best mapping to positions using a greedy search. The algorithm terminates when the improvement of the overall cost c becomes marginal.

TABLE 6

Algorithm 2 Routine nextPMC.

Require: Input PMC set setOfPMCs.
Require: Cost $c_{PMC}$ of setOfPMCs.
Require: Invoice I,
1: (modCombo, cost) := modifiedLineItemCombination(setOfPMCs, I) {Procedure that randomly add/removes line-items and their combination according to the cost $c_{prior}$, $c_{line}$ and the annealing schedule. It returns a modified combination modCombo of line-items and the new cost for $c_{prior}$ and $c_{line}$.}
2: ($c_{PMC}$, setOfPMCs) := modifiedPMCs(setOfPMCs, I) {Procedure that changes randomly labels of some of line-item fields according to the cost $c_{extraction}$, $c_{OCR}$, $c_{sequence}$, $c_{alignment}$ and the annealing schedule. It returns the modified set of PMCs setOfPMCs and its new cost $c_{PMC}$.}

Table 6 illustrates the procedure for iteratively generating the PMC set. A modified PMC set is generated by first making small changes to the current combination of line-items and the considered set of line-item candidates. The changes are sampled according to the costs cprior and dine. Given the current annealing temperature elected changes with a higher cost cprior+cline are sometimes accepted. In a second step the labels of some line-item fields are randomly modified using the costs cextraction, cOCR, csequence, calignment and the current annealing temperature.

While the present invention has been illustrated and described with reference to specific embodiments, further modification and improvements will occur to those skilled in the art. It is to be understood, therefore, that this invention is not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention is executed illustratively incorporates one or more general-purpose computers or special-purpose devices such as facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Figure 4:
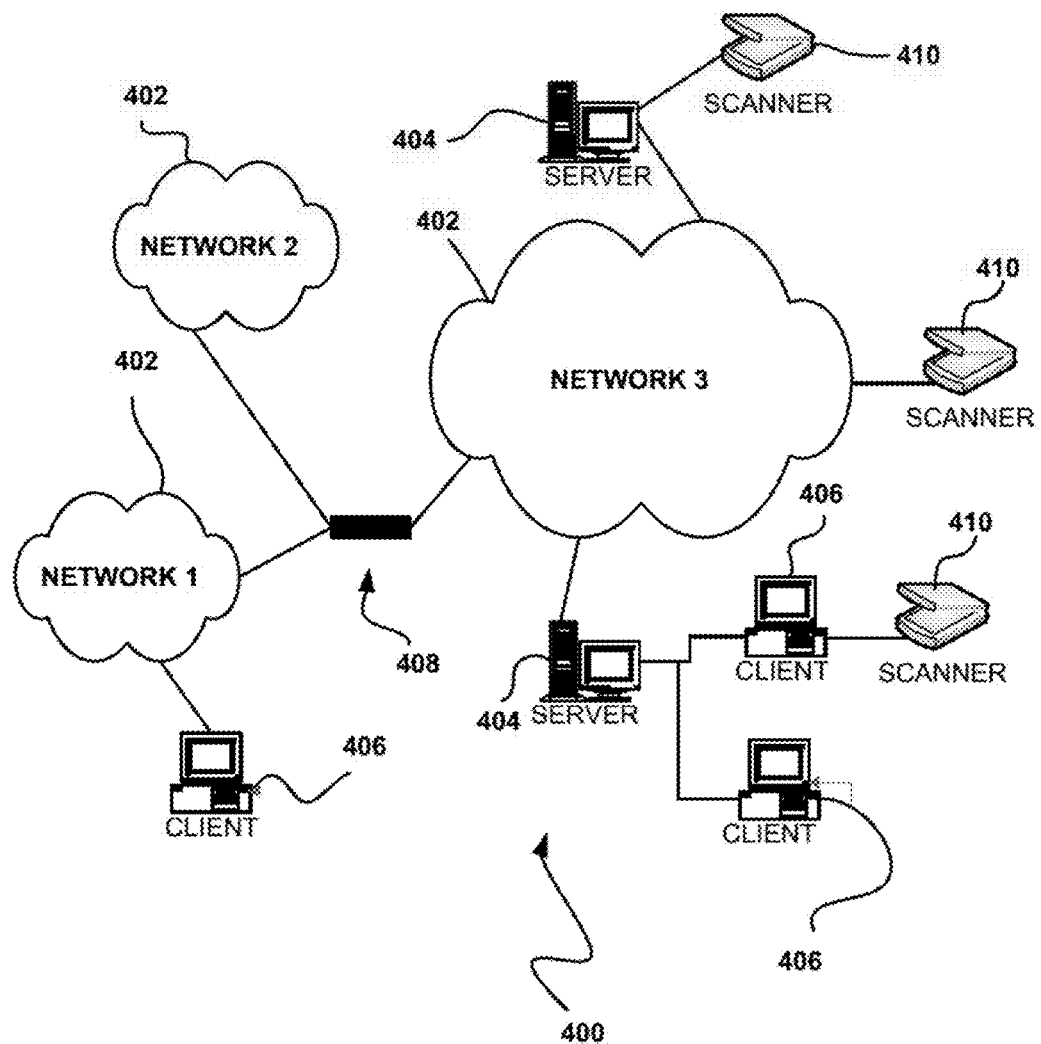
FIG. 4 illustrates a network architecture, in accordance with one embodiment.

FIG. 4 illustrates a network architecture 400, in accordance with one embodiment. As shown, a plurality of networks 402 is provided. In the context of the present network architecture 400, the networks 402 may each take any form including, but not limited to a local area network (LAN), a wireless network, a wide area network (WAN) such as the Internet, peer-to-peer network, etc.

Coupled to the networks 402 are servers 404 which are capable of communicating over the networks 402. Also coupled to the networks 402 and the servers 404 is a plurality of clients 406. Such servers 404 and/or clients 406 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 402, at least one gateway 408 is optionally coupled therebetween.

One or more scanners 410 may be coupled to a network, a server 404 and/or a client 406. The scanner(s) 410 may be accessible by the attached machine and/or remotely by other machines via any interconnection path.

Figure 5:
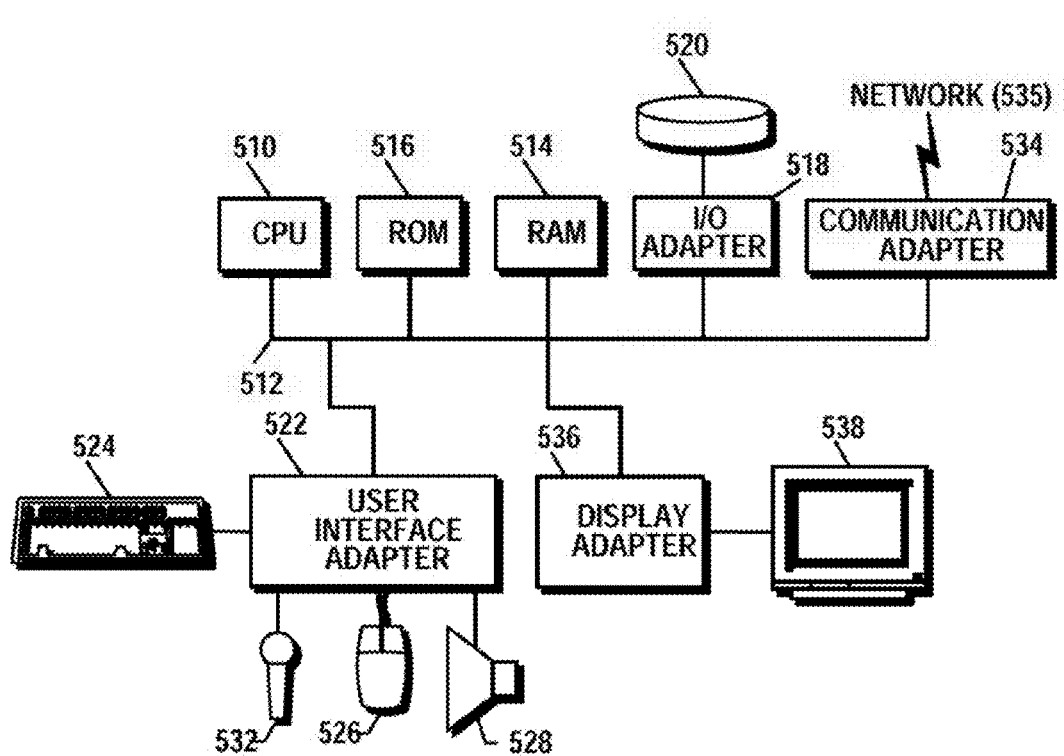
FIG. 5 shows a representative hardware environment that may be associated with the servers and/or clients of FIG. 4, in accordance with one embodiment.

FIG. 5 shows a representative hardware environment that may be associated with the servers 404 and/or clients 406 of FIG. 4, in accordance with one embodiment. Such figure illustrates a typical hardware configuration of a workstation in accordance with one embodiment having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Mobile Device Implementation

In still more approaches, the presently disclosed inventive concepts may be embodied in, practiced using, and/or applied to mobile technology and/or mobile devices. As referred-to herein, a mobile device should be understood to include any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

Similarly, while various embodiments have been described herein as employing a scanner, or involving "scanning" a document, image, etc., it should be understood that the concepts are equally applicable to mobile devices, for example any "scanning" operation discussed herein may be applied to a mobile device and/or mobile computing environment, for example by capturing an image using a mobile device camera rather than "scanning" the image or document.

Those having ordinary skill in the art will appreciate that image data generated using a scanner and image data generated using a camera may have unique aspects or characteristics in some approaches. For example, an image captured using a mobile device camera may include artifacts such as skew, perspective distortion (such as apparent warping or curvature in a truly flat or straight surface/edge), illumination, blur, etc. as would be understood by one having ordinary skill in the art upon reading the present descriptions. Nonetheless, the presently described inventive concepts should be understood as being equally applicable to both traditional scanners and associated computing equipment/resources, as well as mobile capture devices and/or processing devices, in illustrative embodiments.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one exemplary approach, an image may be captured by a capture component, such as a camera, of a mobile device. The term "capture component" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

Financial Document Processing

In a particularly preferred approach, the presently disclosed techniques may be leveraged to advantageously facilitate inspection and/or processing of financial documents. It should be appreciated that the disclosed techniques and processes may be applicable to a number of financial documents generally falling within a class of "tender documents."

As understood herein, a "tender document" may be considered any document suitable for use in tendering payment in the course of a financial transaction. Tender documents include but are not limited to any type of document depicting payment information, including unique identifiers such as an account number, routing number, debit or credit card number, accountholder name, accountholder date of birth, card expiration date accountholder address, financial processing/servicing entity (e.g. VISA, AMERICAN EXPRESS, PAYPAL, or the like), a security code (e.g. credit card validation (CCV) member conventionally included on most credit/debit cards, a scratch-off validation code typically included on gift cards, a personal identification number (PIN), etc.) and/or any other information helpful or required to process a financial transaction using the tender document as the form of payment therefor, as would be understood by one having ordinary skill in the art upon reading the present descriptions).

Exemplary tender documents may include but are not limited to documents such as personal and business checks, money orders, credit cards, debit cards, gift cards, account statements, invoices, receipts, or any other document depicting sufficient information helpful or required to process a financial transaction using the tender document as the form of payment therefor, such as a piece of paper having written thereon an account number and routing number (even if written by hand).

In a typical scenario using techniques available prior to the instant disclosures, a gift card owner may wish to inspect financial information relating to a gift card. For example, the owner may wish to either determine a remaining balance available on the gift card (or equivalently for other types of tender documents, a remaining available credit for a credit card or expense account, etc. as would be understood by one having ordinary skill in the art upon reading the present descriptions).

Typically, the owner determine an account balance by either presenting the physical gift card at a point of sale (e.g. a retail location from which the gift card was issued) or by manually querying a remote resource (e.g. a retailer's website) for the remaining balance using information obtained from the physical gift card (e.g. account number).

However, this process is inconveniently time consuming and burdensome for the gift card owner. For example, the owner must have possession of the physical gift card at the time in order to determine a remaining balance at a point of sale. Similarly, if not at a point of sale, the owner must have access to an Internet-connected computer, e.g. a desktop or laptop computer, which significantly limits the ease and accessibility of determining the gift card balance because the owner must be present at a specific physical location in order to do so.

In the context of mobile devices, the ability to access remote resources via the Internet confers advantageous mobility to the owner's ability to determine gift card balances, removing the need for a desktop or laptop computer. However, as will be appreciated by those having ordinary skill in the art, manually inputting data to a mobile device (such as an account number) is both error-prone and tedious, reducing or defeating much of the advantage conferred by the mobility of the device.

Moreover, and particularly if an account balance is not exhausted by a single purchase, this process or processes may need to be repeated many times in order to determine the remaining balance at a given point in time.

As a result of the tedious and burdensome nature of conventional gift card balance determination, many gift card owners do not utilize the full balance of their gift card. For example, and in at least some conventional scenarios, on average approximately 25% of gift card balances remain unspent, causing undesirable waste of the owner's financial resources.

A promising solution to the aforementioned difficulties presented by traditional, manual gift card balance determination is to at least partially automate the information collection, storage and/or retrieval processes underlying this goal.

Figure 6:
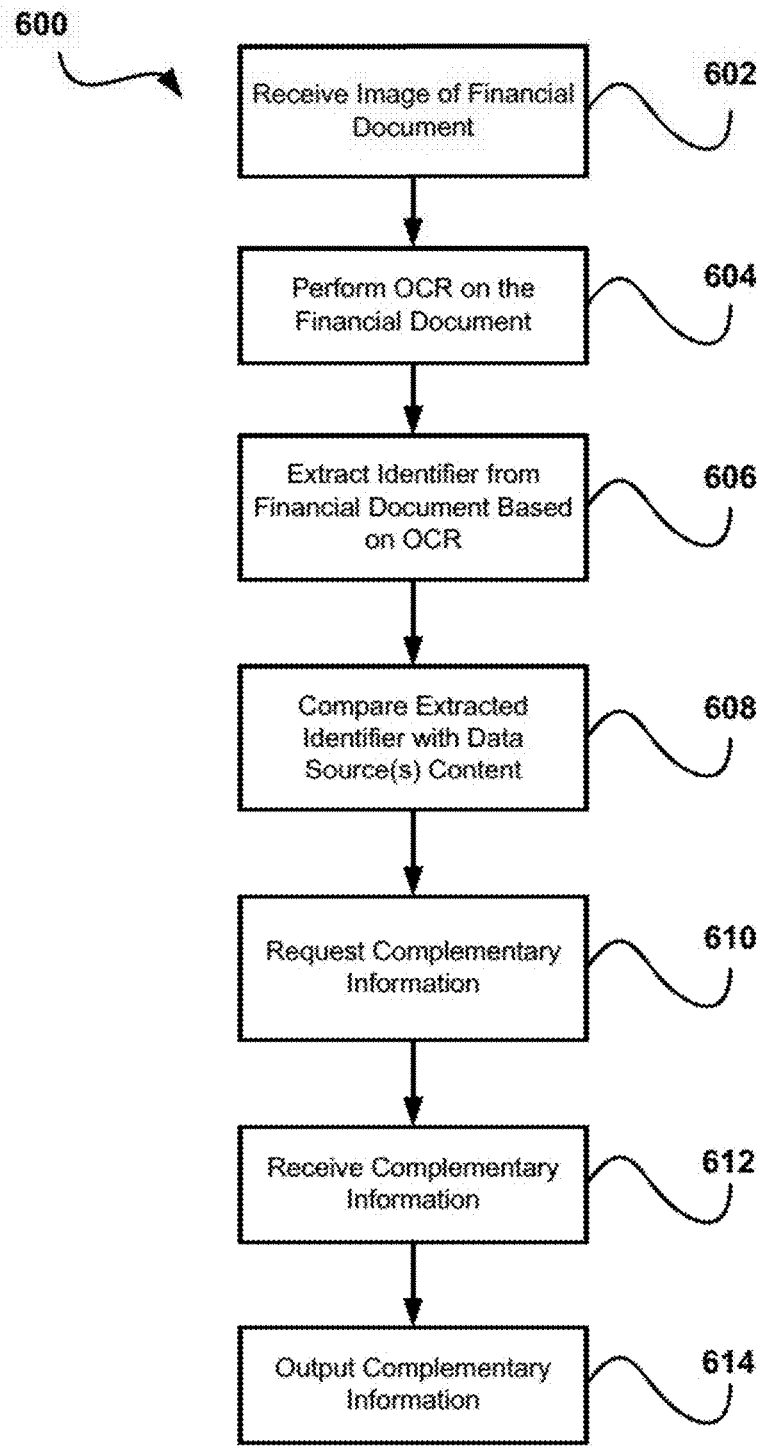
FIG. 6 is a flowchart of a method, according to one embodiment.

Generally speaking, an exemplary technique for processing financial documents such as a tender document in a financial processing workflow includes a process substantially as shown according to method 600 depicted in FIG. 6, according to one embodiment. The method 600 may be performed in any environment, including those depicted in FIGS. 1-5, among others, in various approaches. Moreover, in various alternative embodiments the method 600 may include more or fewer operations than those shown in FIG. 6, including any of the various financial document processing operations disclosed herein.

In accordance with the general embodiment depicted in FIG. 6, method 600 includes operation 602, where an image of a tender document such as a gift card is received, preferably at a mobile device such as a mobile phone. The image may be received according to any suitable technique, in any suitable format, and using any suitable mechanism, convention, or protocol such as would be understood by one having ordinary skill in the art upon reading the present descriptions.

In operation 604, method 600 includes performing OCR on the image. The OCR may be performed in any suitable manner, preferably as described hereinabove.

Method 600 also includes operation 606, where an identifier of the financial document extracted from the image of the financial document, optionally based at least in part on the OCR result obtained from performing operation 604.

Method 600 also includes comparing the extracted identifier with content from one or more data sources in operation 608. The data sources preferably comprise one or more relational databases, but may also include other data sources such as nontraditional databases (e.g. fuzzy databases, NoSQL databases, etc.), electronic documents, electronic records, etc. as would be understood by one having ordinary skill in the art upon reading the present descriptions.

In operation 610, method 600 includes requesting complementary information from at least one of the one or more data sources. The complementary information is based at least in part on the extracted identifier, e.g. the complementary information is preferably located using the extracted identifier as a query submitted to a data source.

In various approaches, method 600 further includes receiving the complementary information in operation 612, and outputting at least some of the received complementary information in operation 614. Preferably the complementary information is output for display on a mobile device, i.e. output in a format suitable for display using a mobile device, and even more preferably the complementary information is displayed to the user via the mobile device display.

In one approach, an image of the tender document may be received, e.g. at the mobile device, and an image processing operation such as optical character recognition (OCR) may be performed on the image. Based in whole or in part on the OCR results, an identifier, and preferably an unique identifier, may be extracted from the image. The extracted identifier may be compared with reference content in one or more databases, which preferably includes at least one database comprising the identifier(s) and related account-identifying information (such as account number) organized in a key=>value type of relational database. Based on the comparison and/or the extracted identifier, complementary information is requested from at least one of the databases. The requested complementary information is received, and at least some of the complementary information is output, e.g. for display.

Preferably, the complementary information that is output is configured and/or formatted for display on a device to which the database(s) are either locally or remotely located. Exemplary devices include a desktop or laptop computer, mobile device such as mobile phone, personal digital assistant, tablet, etc. a data processing and/or storage facility, one or more servers, hosts, clients, etc. as would be understood by one having ordinary skill in the art upon reading the present descriptions.

For example, in one illustrative approach, based in whole or in part on the comparison indicating a match between the extracted identifier and a corresponding "key" identifier in the database(s) to which the related account-identifying information is an associated value, the extracted identifier and/or account-identifying information may be used as a query to retrieve and/or locate the additional account information in either the same or another database.

As understood herein, "identifiers" may include but are not limited to information such as an account number, e.g. a unique 16-digit number in the form of a debit/credit card account number, a security code such as a PIN number, a CCV number, etc. of the tender document from the image based at least in part on the OCR; Preferably, the identifier is and/or encodes/represents a unique string of alphanumeric characters corresponding to the account in which funds for the tender document are allocated/stored.

The identifier may additionally and/or alternatively be encoded on the tender document, for example, in a hologram or barcode (including one-, two- and/or three-dimensional holograms/barcodes), in some approaches. In more complex examples, the identifier may include personal identification information such as an accountholder name, social security number (SSN), tax ID number, date of birth (DOB), place of residence, a logo, a unique image or photograph (e.g. a photograph of the account holder's face for debit cards or personalized gift-cards with embedded photo identification), etc. as would be understood by one having ordinary skill in the art upon reading the present descriptions.

Account-identifying information may also include "identifiers" as defined above, as well as any type of financial information that may be used to identify and/or gain authorized access to a financial account, such as an account balance, account activity/transaction history, identity of one or more financial processing/servicing entities (e.g. VISA, AMERICAN EXPRESS, PAYPAL, or the like), etc. as would be understood by one having ordinary skill in the art upon reading the present descriptions.

Additional account information may include account-identifying information, and/or any additional information that would be useful in conducting inspection of the account and/or facilitating financial transactions using the account. For example, additional account information may include, according to various embodiments, one or more of account balance, transaction history, identifying information about the account holder (such as name, date of birth, social security number, etc.), identity of suitable or associated financial processing/servicing entities, etc. as would be understood by one having ordinary skill in the art upon reading the present descriptions. Preferably, the additional account information includes information that is particularly useful for facilitating financial transactions (as opposed to merely locating and/or retrieving account information for a user's inspection or review).

Even more preferably, the account-identifying information and the additional account information are included in one or more databases. The database(s) may be used singly or in combination to efficiently and easily retrieve such information for review and/or facilitate the corresponding financial transactions, e.g. in downstream financial processes or processing as described in further detail below.

At least some of the databases are preferably stored in a memory of the mobile device. For example, with respect to the account-identifying information in particular, locally storing the database with the identifiers and account-identifying information would enable quick access to account-identifying information as compared, for example, to a similar operation using a remotely stored database. Even more preferably, data such as identifiers, account-identifying information, additional account information, etc. may be associated with the image and optionally stored, locally or remotely to the user and/or user device. Any of the data may be associated with the image, for example, as metadata for ease of future reference and use.

For example, in one embodiment a user installs a "Tender document Wallet" app or a retailer-specific gift-card app on their mobile device. The app includes instructions for the mobile device to store information about any tender documents the user may own, such as images of the tender documents, as well as pertinent information associated therewith (e.g. account number, PIN, identifier, etc.).

In some embodiments, it may also be advantageous for the app to locally store pertinent financial information and update the locally stored pertinent financial information in real-time in response to the user conducting a financial transaction relating thereto. In a preferred embodiment, for example, the app may update the locally stored financial information in response to the user conducting a financial transaction using the tender document to which the financial information pertains.

In this manner, the user may be provided with accurate real-time financial tracking, even if a financial institution managing the account to which the tender document is linked has not yet updated the corresponding financial information in the financial institution's system/records. Such processing delays are common when transferring funds between financial institutions, using intermediary service providers, etc. as would be understood by one having ordinary skill in the art upon reading the present descriptions. These "normal" delays may undesirably cause information reported by the financial institution (e.g. an account balance) to "lag" and thus imperfectly reflect the true status of the corresponding account.

Moreover, the app preferably stores an image of the tender document locally in the mobile device memory. Upon being retrieved/received, e.g. via user input and/or using the first and/or second databases such as described above, information pertaining to the tender document (e.g. tender document identifier, account number, account balance, etc.) is preferably associated with the stored tender document image. More preferably, the pertinent information is stored as metadata, though any suitable storage paradigm that would be recognized by one having ordinary skill in the art upon reading the present descriptions may be employed without departing from the scope of this disclosure.

By storing pertinent information locally, the app may more efficiently and conveniently retrieve, display and/or update the pertinent information as needed or useful to the user. For example, those having ordinary skill in the art will appreciate the performance advantages of storing pertinent information locally as opposed to in a remote storage resource, such advantages including but not being limited to reduced processing time, particularly for the processes comparing and/or identifying information stored in the remote storage resource.

In a preferred approach, a user may capture an image of one or more tender documents. The image is preferably captured using a capture component (e.g. "camera" as described above) of a mobile device so that the owner may determine their tender document balance without the conventional restrictions on physical location (i.e. requiring access to a desktop or laptop computer). The captured image may be optionally stored to a memory, e.g. a memory of the mobile device, for future use and/or re-use as described herein. Notably, other embodiments of the present disclosures also encapsulate scenarios where a tender document image is not captured, but otherwise received at a device (preferably a device having a processor, such as a mobile device) for subsequent use in determining information associated with the tender document, such as an associated tender document account balance.

The image of the tender document is analyzed by performing OCR thereon. The OCR may be utilized substantially as described above to identify and/or extract characters, and particularly text characters, from the image. Even more preferably, the extracted characters include an identifier that uniquely identifies the tender document. The identifier may take any suitable form known in the art, and in some approaches may be embodied as an alphanumeric string of characters, e.g. a tender document account number (such as a 16-digit account number typically associated with credit/debit card accounts), a security code (such as a CCV code on a debit/credit card, a scratch-off validation code, a personal identification number (PIN), etc.) an expiration date (e.g. in the format "MM/YY"), etc. as would be understood by one having ordinary skill in the art upon reading the present descriptions.

Upon extracting the tender document identifier, the presently disclosed techniques may leverage a number of advantageous features to provide a tender document owner with useful information and/or services regarding their tender document. For example, in one approach the tender document identifier comprises one or more of an account number and a security code. A request may be submitted to a remote resource for information corresponding to the tender document using the identifier as a query. More specifically, in one embodiment the extracted identifier may be compared to textual information from a complementary document.

In particularly advantageous embodiments, the presently disclosed techniques may assist a user by automatically correcting OCR errors and/or normalizing data from the tender document. For example, a tender document image is defective in at least one aspect, e.g. the image is blurry or a portion of a tender document is obscured in a particular image. Moreover, the blurry or obscured portion negatively impacts the identifier extraction process, such that the OCR thereof includes errors. The present techniques may automatically accommodate this type of OCR error by utilizing textual information a complementary document and/or predefined business rules to correct OCR errors and/or normalize data from the tender document. Several illustrative examples of OCR error correction and data normalization are described below.

In one embodiment, an extracted tender document identifier is compared to textual information from a complementary document. The textual information from the complementary document preferably corresponds to the identifier in the tender document, and may thus be utilized as a comparison point to link a particular tender document to specific financial information. For example, the complementary document preferably comprises an electronic record in a database or financial information repository, and the comparison may comprise submitting the extracted identifier as a query to the database which includes the complementary document as a record. Using the extracted identifier as a query, the complementary document (e.g. database record) may be retrieved, e.g. as a value to which the identifier serves as a key in a conventional "key=>value" relational database structure.

In one approach, a match between the identifiers indicates that the tender document from which the identifier was extracted corresponds to account information in and/or relating to the complementary document, and allows facile retrieval of useful account information contained in the textual information of the complementary document, such as a remaining available balance for the tender document, an expiration date of the tender document (particularly credit/debit/ gift cards), an identity of eligible payment servicers and/or retailers (e.g. VISA, AMERICAN EXPRESS, PAYPAL, MACY'S, AMAZON, etc. as would be understood by one having ordinary skill in the art upon reading the present descriptions).

A mismatch, by contrast, may indicates that the tender document from which the identifier was extracted does not correspond to the complementary document, and does not enable access any account information in or related thereto.

In preferred embodiments, however, where the mismatch comprises only one or a relatively small number of the identifier characters (up to 25% of the overall characters, for example), the partial match may be indicative of OCR errors with respect to the extracted identifier, rather than a discrepancy between the "true" identifier and the corresponding identifier information from the complementary document (e.g. the "textual information" in some approaches). Similarly, in embodiments where an identifier or other information is input by a user, a partial match may be indicative of erroneous data input rather than a discrepancy between the "true" identifier and the corresponding identifier information from the complementary document.

To account for, and automatically correct, such OCR and/ or data input errors, in some approaches the extracted identifier may be corrected. For instance, preferably the extracted identifier is corrected using the textual information from the complementary document and/or predefined business rules. Predefined business rules, in this context, may preferably include business-oriented or criteria/conditions for processing data, such as setting a threshold for the acceptable amount of mismatch to which correction may be applied (e.g. correction may be applied to mismatches of less than a maximum threshold number of characters, a maximum percentage of characters, etc., corrections may only be applied to mismatches fitting within a predefined set of "acceptable" errors e.g. a number "1" instead of a letter "l" and vise-versa, including dash(es) "--" instead of hyphen(s) "-", etc.) and other similar business-oriented criteria/conditions as would be understood by one having ordinary skill in the art upon reading the present descriptions.

Preferably, the OCR errors may be corrected, for example, by replacing the extracted identifier with the corresponding identifier data from the complementary document textual information. This is a more common and reliable method of correction because it is generally more likely that a reference of information, e.g. a reference database organizing customer account data and subject to data review and/or curation, will contain/report "correct" values for the sought-after data than that an automated or semi-automated image analysis procedure (e.g. OCR) will accurately or "correctly" identify the corresponding values.

Of course, in embodiments where a particular image processing or analysis technique is known to perform particularly well or produce highly accurate results within acceptable confidence intervals, the foregoing assumption may be inverted. In these situations, according to one approach, the extracted identifier may be considered more likely to report the "correct" values for the sought-after data and any mismatches resolved in favor of the extracted identifier values rather than the corresponding values in the reference.

Additionally and/or alternatively, an extracted identifier may be modified, or an identifier may be manually designated by prompting a user to input data. The prompt may be issued, in various approaches, either as a matter of course in the progression through a workflow, and/or in response to determining the existence of a complete or partial mismatch between the identifier (whether extracted, designated, or otherwise obtained/determined) and the corresponding reference information, e.g. textual information from the complementary document.

Detecting the mismatch may, for example, take the form of determining the existence of one or more OCR errors as described above, and prompting the user for input relating to the imaged financial document at least partially in response to determining the existence of the OCR error(s). Most preferably, user input is received via a mobile device, and relates to one or more of OCR errors, the textual information from the imaged financial document and/or the complementary document, and the predefined business rules.

Similarly, other discrepancies not arising from either of OCR errors or data input errors as described above may nonetheless be automatically handled using the present techniques. In one embodiment, according to textual information from a complementary document (e.g. an electronic record in a reference database) an identifier is expected to be in a predetermined format. For example the identifier may be an account number expected in a 16-digit numerical format substantially fitting "####-####-####" as seen typically on conventional credit/debit cards, or an expiration date in a "MM/

YY" format, etc. as would be understood by one having ordinary skill in the art upon reading the present descriptions. The extracted identifier may be accurately extracted, but nonetheless be presented in a different format than expected (e.g. the identifier may include or exclude expected symbols or formatting, such as spaces, dashes, or impermissible characters (e.g. a month designation in a date, such as "Jan" or "January" including alphabetic characters where the expected format is strictly numerical, such as "01").

Discrepancies of this nature may be automatically resolved by leveraging data normalization functionalities. For example, in some approaches where an extracted identifier comprises a date, there are a finite set of suitable formats in which the date data may be expressed, such as 01 January, 2001; January 01, 2001, 01/01/01. Jan. 1, 01. etc. as would be understood by one having ordinary skill in the art upon reading the present descriptions. Other types of identifier data may similarly be expressed in a finite number of formats, including account number (e.g. conventional 16-digit account numbers in the format ####-####-####-####, #### #### #### ####, ################, etc.), cardholder name (e.g. Last, First; Last, First, Middle Initial (MI); First Last; First MI. Last; etc.), security code (e.g. either a three-digit or four-digit number, an alphanumeric string including both letters and numbers, etc.), etc. as would be understood by one having ordinary skill in the art upon reading the present descriptions.

Additionally and/or alternatively, discrepancies in data formatting may be resolved by leveraging user input to enable normalization. For example, upon determining the existence of a discrepancy, the presently disclosed techniques may seek and/or leverage user input in order to normalize the data. In one illustrative approach, an extracted identifier is recognized as fitting a data format typically associated with a date (e.g. "Jan. 01, 2001"), but the extracted identifier does not match corresponding textual information from the complementary document due to improper formatting. Rather than attempting to automatically normalize the improperly-formatted identifier, a user may be prompted to designate the appropriate format, either from a list of predetermined formatting options or by defining a format de novo.

Based on the finite set of possible formats for the identifier data, the presently disclosed techniques may be configured to automatically normalize data obtained (e.g. via extraction) from the imaged financial document in a manner that the data obtained from the financial document matches an expected format of corresponding data, e.g. contained/depicted in textual information of the complementary document. For example, upon determining that extracted data such as a date is in a particular format (e.g. Jan. 01, 2001) other than an expected format (e.g. MM/YY), it is advantageous to convert the extracted data from the particular format to the expected format, enabling facile and accurate matching between the identifier data derived from the image and the corresponding textual information from the complementary document.

In other instances, it may be advantageous to utilize an iterative approach to achieve data normalization. For example, in one embodiment a first iteration operates substantially as described above—extracting an identifier from an image of a document and comparing the extracted identifier to corresponding data from one or more data sources (e.g. the textual information from the complementary document, database record, the predefined business rules, etc.). However, the first iteration comparison fails to yield any match between the extracted identifier and the corresponding data from the data source(s). In some approaches, the mismatches may be a result of OCR errors rather than true mismatch between the identifier on the imaged document and the corresponding data from the one or more data sources.

OCR errors of this nature may be corrected, in some approaches, by determining one or more characteristics of data corresponding to the identifier. In one embodiment, the first OCR iteration may extract the identifier in an unacceptable format (e.g. the data is not properly normalized) and/or perform the OCR in a manner such that the extracted identifier contains one or more OCR errors. As a result, the extracted identifier fails to match any corresponding data in the one or more data sources, despite the fact that the "true" identifier as depicted on the document actually matches at least some of the corresponding data. False negative results of this variety may be mitigated or avoided by modifying parameters, rules and/or assumptions underlying the OCR operation based on identifier characteristics.

For example, in one embodiment an identifier is extracted, and compared to corresponding data from one or more data sources. The string of characters comprising the extracted identifier does not match any account number in the corresponding data. In response to failing to identify any corresponding data in the data sources, the extracted identifier is further analyzed to determine characteristics thereof.

In one approach, the extracted identifier may be compared to a plurality of predefined identifier types (e.g. "First Name," "Last Name," "Account Number," "expiration date," "PIN," etc.) to determine whether the extracted identifier exhibits any characteristic(s) corresponding to one of the predefined identifier types. For example, the extracted identifier and the predefined identifier types may be compared to determine the existence of any similarities with respect to data formatting and/or data values.

Exemplary identifier characteristics suitable for such comparison, in some approaches include string length, string alphabet, (i.e. the set of characters from which the identifier may be formed, such as "alphabetic," "numeral," "alphanumeric," etc.), presence of one or more discernable pattern(s) common to identifiers of a particular type, or any other characteristic that would be recognized by a skilled artisan reading these descriptions. In a preferred approach, identifier characteristics may include any pattern recognizable using known pattern-matching tools, for example regular expressions.

Additionally and/or alternatively, the identifier type may be determined in whole or in part based on one or more document characteristics, such as: a location in the document from which the identifier is extracted; a classification of the document from which the identifier is extracted (such as disclosed in related U.S. patent application Ser. No. 13/802, 226, filed Mar. 13, 2013 and herein incorporated by reference); and/or characteristic(s) of data located adjacent, above, below, or otherwise spatially proximate to the identifier on the document, etc. as would be understood by skilled artisans upon reading the instant descriptions. For example, in a preferred embodiment identifier characteristics may be determined based on a location from which an identifier is extracted being located below data depicting related information, such as an identifier being located below a street address line, which typically corresponds to a city, state, and/or zip code, particularly in documents depicting a mailing address. In another preferred embodiment, identifier characteristic(s) may be determined based on an identifier being extracted from a location horizontally adjacent to related data, for example as is the case for an expiration date or account number, respectively, as depicted on typical credit and debit card documents.

Document Classification

In accordance with one inventive embodiment commensurate in scope with the present disclosures, a method may be carried out in any desired environment, and may include embodiments and/or approaches. Of course, more or less operations may be performed in accordance with the method, as would be appreciated by one of ordinary skill in the art upon reading the present descriptions.

In one operation, a digital image captured by a mobile device is received.

In one embodiment the digital image may be characterized by a native resolution. As understood herein, a "native resolution" may be an original, native resolution of the image as originally captured, but also may be a resolution of the digital image after performing some pre-classification processing such as any of the image processing operations described above and in copending U.S. patent application Ser. No. 13/740,123, filed Jan. 11, 2013, a virtual re-scan (VRS) processing as disclosed in related U.S. Pat. No. 6,370,277, etc. as would be understood by one having ordinary skill in the art upon reading the present descriptions. In one embodiment, the native resolution is approximately 500 pixels by 600 pixels (i.e. a 500×600 digital image) for a digital image of a driver license subjected to processing by VRS before performing classification. Moreover, the digital image may be characterized as a color image in some approaches, and in still more approaches may be a cropped-color image, i.e. a color image depicting substantially only the object to be classified, and not depicting image background.

In another operation, a first representation of the digital image is generated using a processor of the mobile device. The first representation may be characterized by a reduced resolution, in one approach. As understood herein, a "reduced resolution" may be any resolution less than the native resolution of the digital image, and more particularly any resolution suitable for subsequent analysis of the first representation according to the principles set forth herein.

In preferred embodiments, the reduced resolution is sufficiently low to minimize processing overhead and maximize computational efficiency and robustness of performing the algorithm on the respective mobile device, host device and/or server platform. For example, in one approach the first representation is characterized by a resolution of about 25 pixels by 25 pixels, which has been experimentally determined to be a particularly efficient and robust reduced resolution for processing of relatively small documents, such as business cards, driver licenses, receipts, etc. as would be understood by one having ordinary skill in the art upon reading the present descriptions.

Of course, in other embodiments, different resolutions may be employed without departing from the scope of the present disclosure. For example, classification of larger documents or objects may benefit from utilizing a higher resolution such as 50 pixels by 50 pixels, 100 pixels by 100 pixels, etc. to better represent the larger document or object for robust classification and maximum computational efficiency. The resolution utilized may or may not have the same number of pixels in each dimension. Moreover, the most desirable resolution for classifying various objects within a broad range of object classes may be determined experimentally according to a user's preferred balance between computational efficiency and classification robustness. In still more embodiments, any resolution may be employed, and preferably the resolution is characterized by comprising between 1 pixel and about 1000 pixels in a first dimension, and between 1 and about 1000 pixels in a second dimension.

One exemplary embodiment of inputs, outputs and/or results of a process flow for generating the first representation will now be presented with particular reference to -, which respectively depict: a digital image before being divided into sections (e.g. digital image); a digital image divided into sections (e.g. sections in); and a first representation of the digital image (e.g. representation in) characterized by a reduced resolution.

In one embodiment, a digital image captured by a mobile device may be divided into a plurality of sections. Each section may comprise a plurality of pixels, which may comprise a substantially rectangular grid of pixels such that the section has dimensions of $ps_{(x)}$ horizontal pixels ($ps_{(x)}$=4 in) by $ps_{(y)}$ vertical pixels ($ps_{(y)}$=4 in).

In one general embodiment, a first representation may be generated by dividing a digital image R (having a resolution of $x_R$ pixels by $y_R$ pixels) into $S_x$ horizontal sections and $S_y$ vertical sections and thus may be characterized by a reduced resolution r of $S_x$ pixels by $S_y$ pixels. Thus, generating the first representation essentially includes generating a less-granular representation of the digital image.

For example, in one approach the digital image is divided into S sections, each section corresponding to one portion of an s-by-s grid. Generating the first representation involves generating a s-pixel-by-s-pixel first representation, where each pixel in the first representation corresponds to one of the S sections of the digital image, and wherein each pixel is located in a position of the first representation corresponding to the location of the corresponding section in the digital image, i.e. the upper-leftmost pixel in the first representation corresponds to the upper-leftmost section in the digital image, etc.

Of course, other reduced resolutions may be employed for the first representation, ideally but not necessarily according to limitations and/or features of a mobile device, host device, and or server platform being utilized to carry out the processing, the characteristics of the digital image (resolution, illumination, presence of blur, etc.) and/or characteristics of the object which is to be detected and/or classified (contrast with background, presence of text or other symbols, closeness of fit to a general template, etc.) as would be understood by those having ordinary skill in the art upon reading the present descriptions.

In some approaches, generating the first representation may include one or more alternative and/or additional suboperations, such as dividing the digital image into a plurality of sections. The digital image may be divided into a plurality of sections in any suitable manner, and in one embodiment the digital image is divided into a plurality of rectangular sections. Of course, sections may be characterized by any shape, and in alternative approaches the plurality of sections may or may not represent the entire digital image, may represent an oversampling of some regions of the image, or may represent a single sampling of each pixel depicted in the digital image. In a preferred embodiment, as discussed above regarding -, the digital image is divided into S substantially square sections to form an sxs grid.

In further approaches, generating the first representation may also include determining, for each section of the digital image, at least one characteristic value, where each characteristic value corresponds to one or more features descriptive of the section. Within the scope of the present disclosures, any feature that may be expressed as a numerical value is suitable for use in generating the first representation, e.g. an average brightness or intensity (0-255) across each pixel in the section, an average value (0-255) of each color channel of each pixel in the section, such as an average red-channel value, and average green-channel value, and an average blue-channel value for a red-green-blue (RGB) image, etc. as would be understood by one having ordinary skill in the art upon reading the present descriptions.

With continuing reference to FIGS., in some embodiments each pixel of the first representation corresponds to one of the S sections not only with respect to positional correspondence, but also with respect to feature correspondence. For example, in one approach generating the first representation may additionally include determining a characteristic section intensity value $i_S$ by calculating the average of the individual intensity values $i_P$ of each pixel in the section. Then, each pixel in the first representation is assigned an intensity value equal to the average intensity value $i_S$ calculated for the corresponding section of the digital image. In this manner, the first representation reflects a less granular, normalized representation of the features depicted in digital image.

Of course, the pixels comprising the first representation may be represented using any characteristic value or combination of characteristic values without departing from the scope of the presently disclosed classification methods. Further, characteristic values may be computed and/or determined using any suitable means, such as by random selection of a characteristic value from a distribution of values, by a statistical means or measure, such as an average value, a spread of values, a minimum value, a maximum value, a standard deviation of values, a variance of values, or by any other means that would be known to a skilled artisan upon reading the instant descriptions.

In another operation, a first feature vector is generated based on the first representation.

The first feature vector and/or reference feature matrices may include a plurality of feature vectors, where each feature vector corresponds to a characteristic of a corresponding object class, e.g. a characteristic minimum, maximum, average, etc. brightness in one or more color channels at a particular location (pixel or section), presence of a particular symbol or other reference object at a particular location, dimensions, aspect ratio, pixel density (especially black pixel density, but also pixel density of any other color channel), etc.

As would be understood by one having ordinary skill in the art upon reading the present descriptions, feature vectors suitable for inclusion in first feature vector and/or reference feature matrices comprise any type, number and/or length of feature vectors, such as described in U.S. patent application Ser. No. 12/042,774, filed Mar. 5, 2008; and Ser. No. 12/368,685, filed Feb. 10, 2009 and/or U.S. Pat. No. 7,761,391, granted Jul. 20, 2010 (U.S. patent application Ser. No. 11/752,364, filed May 13, 2007).

In another operation, the first feature vector is compared to a plurality of reference feature matrices.

The comparing another operation may be performed according to any suitable vector matrix comparison, such as described in U.S. patent application Ser. No. 12/042,774, filed Mar. 5, 2008; and Ser. No. 12/368,685, filed Feb. 10, 2009 and U.S. Pat. No. 7,761,391, granted Jul. 20, 2010 (U.S. patent application Ser. No. 11/752,364, filed May 13, 2007).

Thus, in such approaches the comparing may include an N-dimensional feature space comparison. In at least one approach, N is greater than 50, but of course, N may be any value sufficiently large to ensure robust classification of objects into a single, correct object class, which those having ordinary skill in the art reading the present descriptions will appreciate to vary according to many factors, such as the complexity of the object, the similarity or distinctness between object classes, the number of object classes, etc.

As understood herein, "objects" include any tangible thing represented in an image and which may be described according to at least one unique characteristic such as color, size, dimensions, shape, texture, or representative feature(s) as would be understood by one having ordinary skill in the art upon reading the present descriptions. Additionally, objects include or classified according to at least one unique combination of such characteristics. For example, in various embodiments objects may include but are in no way limited to persons, animals, vehicles, buildings, landmarks, documents, furniture, plants, etc. as would be understood by one having ordinary skill in the art upon reading the present descriptions.

For example, in one embodiment where attempting to classify an object depicted in a digital image as one of only a small number of object classes (e.g. 3-5 object classes), each object class being characterized by a significant number of starkly distinguishing features or feature vectors (e.g. each object class corresponding to an object or object(s) characterized by very different size, shape, color profile and/or color scheme and easily distinguishable reference symbols positioned in unique locations on each object class, etc.), a relatively low value of N may be sufficiently large to ensure robust classification.

On the other hand, where attempting to classify an object depicted in a digital image as one of a large number of object classes (e.g. 30 or more object classes), and each object class is characterized by a significant number of similar features or feature vectors, and only a few distinguishing features or feature vectors, a relatively high value of N may be preferable to ensure robust classification. Similarly, the value of N is preferably chosen or determined such that the classification is not only robust, but also computationally efficient; i.e. the classification process(es) introduce only minimal processing overhead to the device(s) or system(s) utilized to perform the classification algorithm.

The value of N that achieves the desired balance between classification robustness and processing overhead will depend on many factors such as described above and others that would be appreciated by one having ordinary skill in the art upon reading the present descriptions. Moreover, determining the appropriate value of N to achieve the desired balance may be accomplished using any known method or equivalent thereof as understood by a skilled artisan upon reading the instant disclosures.

In a concrete implementation, directed to classifying driver licenses according to state and distinguishing driver licenses from myriad other document types, it was determined that a 625-dimensional comparison (N=625) provided a preferably robust classification without introducing unsatisfactorily high overhead to processing performed using a variety of current-generation mobile devices.

In another operation, an object depicted in the digital image is classified as a member of a particular object class based at least in part on the comparing another operation. More specifically, the comparing another operation may involve evaluating each feature vector of each reference feature matrix, or alternatively evaluating a plurality of feature matrices for objects belonging to a particular object class, and identifying a hyper-plane in the N-dimensional feature space that separates the feature vectors of one reference feature matrix from the feature vectors of other reference feature matrices. In this manner, the classification algorithm defines concrete hyper-plane boundaries between object classes, and may assign an unknown object to a particular object class based on similarity of feature vectors to the particular object class and/or dissimilarity to other reference feature matrix profiles.

In the simplest example of such feature-space discrimination, imagining a two-dimensional feature space with one feature plotted along the ordinate axis and another feature plotted along the abscissa, objects belonging to one particular class may be characterized by feature vectors having a distribution of values clustered in the lower-right portion of the feature space, while another class of objects may be characterized by feature vectors exhibiting a distribution of values clustered in the upper-left portion of the feature space, and the classification algorithm may distinguish between the two by identifying a line between each cluster separating the feature space into two classes—"upper left" and "lower-right." Of course, as the number of dimensions considered in the feature space increases, the complexity of the classification grows rapidly, but also provides significant improvements to classification robustness, as will be appreciated by one having ordinary skill in the art upon reading the present descriptions.

Additional Processing

In some approaches, classification according to embodiments of the presently disclosed methods may include one or more additional and/or alternative features and/or operations, such as described below.

In one embodiment, classification such as described above may additionally and/or alternatively include assigning a confidence value to a plurality of putative object classes based on the comparing operation (e.g. as performed in another operation of the method) the presently disclosed classification methods, systems and/or computer program products may additionally and/or alternatively determine a location of the mobile device, receive location information indicating the location of the mobile device, etc. and based on the determined location, a confidence value of a classification result corresponding to a particular location may be adjusted. For example, if a mobile device is determined to be located in a particular state (e.g. Maryland) based on a GPS signal, then during classification, a confidence value may be adjusted for any object class corresponding to the particular state (e.g. Maryland Driver License, Maryland Department of Motor Vehicle Title/Registration Form, Maryland Traffic Violation Ticket, etc. as would be understood by one having ordinary skill in the art upon reading the present descriptions).

Confidence values may be adjusted in any suitable manner, such as increasing a confidence value for any object class corresponding to a particular location, decreasing a confidence value for any object class not corresponding to a particular location, normalizing confidence value(s) based on correspondence/non-correspondence to a particular location, etc. as would be understood by the skilled artisan reading the present disclosures.

The mobile device location may be determined using any known method, and employing hardware components of the mobile device or any other number of devices in communication with the mobile device, such as one or more satellites, wireless communication networks, servers, etc. as would be understood by one having ordinary skill in the art upon reading the present descriptions.

For example, the mobile device location may be determined based in whole or in part on one or more of a global-positioning system (GPS) signal, a connection to a wireless communication network, a database of known locations (e.g. a contact database, a database associated with a navigational tool such as Google Maps, etc.), a social media tool (e.g. a "check-in" feature such as provided via Facebook, Google Plus, Yelp, etc.), an IP address, etc. as would be understood by one having ordinary skill in the art upon reading the present descriptions.

In more embodiments, classification additionally and/or alternatively includes outputting an indication of the particular object class to a display of the mobile device; and receiving user input via the display of the mobile device in response to outputting the indication. While the user input may be of any known type and relate to any of the herein described features and/or operations, preferably user input relates to confirming, negating or modifying the particular object class to which the object was assigned by the classification algorithm.

The indication may be output to the display in any suitable manner, such as via a push notification, text message, display window on the display of the mobile device, email, etc. as would be understood by one having ordinary skill in the art. Moreover, the user input may take any form and be received in any known manner, such as detecting a user tapping or pressing on a portion of the mobile device display (e.g. by detecting changes in resistance, capacitance on a touch-screen device, by detecting user interaction with one or more buttons or switches of the mobile device, etc.)

In one embodiment, classification further includes determining one or more object features of a classified object based at least in part on the particular object class. Thus, classification may include determining such object features using any suitable mechanism or approach, such as receiving an object class identification code and using the object class identification code as a query and/or to perform a lookup in a database of object features organized according to object class and keyed, hashed, indexed, etc. to the object class identification code.

Object features within the scope of the present disclosures may include any feature capable of being recognized in a digital image, and preferably any feature capable of being expressed in a numerical format (whether scalar, vector, or otherwise), e.g. location of subregion containing reference object(s) (especially in one or more object orientation states, such as landscape, portrait, etc.) object color profile, or color scheme, object subregion color profile or color scheme, location of text, etc. as would be understood by one having ordinary skill in the art upon reading the present descriptions.

In accordance with another inventive embodiment commensurate in scope with the present disclosures, a method may be carried out in any desired environment. Of course, more or less operations may be performed in accordance with the method, as would be appreciated by one of ordinary skill in the art upon reading the present descriptions.

In one operation, a first feature vector is generated based on a digital image captured by a mobile device.

In another operation, the first feature vector is compared to a plurality of reference feature matrices.

In another operation, an object depicted in the digital image is classified as a member of a particular object class based at least in part on the comparing (e.g. the comparing performed in another operation).

In another operation, one or more object features of the object are determined based at least in part on the particular object class.

In another operation, a processing operation is performed. The processing operation includes performing one or more of the following subprocesses: detecting the object depicted in the digital image based at least in part on the one or more object features, rectangularizing the object depicted in the digital image based at least in part on the one or more object features; cropping the digital image based at least in part on the one or more object features; and binarizing the digital image based at least in part on the one or more object features.

As will be further appreciated by one having ordinary skill in the art upon reading the above descriptions of document classification, in various embodiments it may be advantageous to perform one or more additional processing operations, such as the subprocesses described above, on a digital image based at least in part on object features determined via document classification.

For example, after classifying an object depicted in a digital image, such as a document, it may be possible to refine other processing parameters, functions, etc. and/or utilize information known to be true for the class of objects to which the classified object belongs, such as object shape, size, dimensions, location of regions of interest on and/or in the object, such as regions depicting one or more symbols, patters, text, etc. as would be understood by one having ordinary skill in the art upon reading the present descriptions.

Regarding performing page detection based on classification, it may be advantageous in some approaches to utilize information known about an object belonging to a particular object class in order to improve object detection capabilities. For example, and as would be appreciated by one having ordinary skill in the art, it may be less computationally expensive, and/or may result in a higher-confidence or higher-quality result to narrow a set of characteristics that may potentially identify an object in a digital image to one or a few discrete, known characteristics, and simply search for those characteristic(s).

Exemplary characteristics that may be utilized to improve object detection may include characteristics such as object dimensions, object shape, object color, one or more reference features of the object class (such as reference symbols positioned in a known location of a document).

In another approach, object detection may be improved based on the one or more known characteristics by facilitating an object detection algorithm distinguishing regions of the digital image depicting the object from regions of the digital image depicting other objects, image background, artifacts, etc. as would be understood by one having ordinary skill in the art upon reading the present descriptions. For example, if objects belonging to a particular object class are known to exhibit a particular color profile or scheme, it may be simpler and/or more reliable to attempt detecting the particular color profile or scheme within the digital image rather than detecting a transition from one color profile or scheme (e.g. a background color profile or scheme) to another color profile or scheme (e.g. the object color profile or scheme), especially if the two colors profiles or schemes are not characterized by sharply contrasting features.

Regarding performing rectangularization based on classification, it may be advantageous in some approaches to utilize information known about an object belonging to a particular object class in order to improve object rectangularization capabilities. For example, and as would be appreciated by one having ordinary skill in the art, it may be less computationally expensive, and/or may result in a higher-confidence or higher-quality result to transform a digital representation of an object from a native appearance to a true configuration based on a set of known object characteristics that definitively represent the true object configuration, rather than attempting to estimate the true object configuration from the native appearance and project the native appearance onto an estimated object configuration.

In one approach, the classification may identify known dimensions of the object, and based on these known dimensions the digital image may be rectangularized to transform a distorted representation of the object in the digital image into an undistorted representation (e.g. by removing projective effects introduced in the process of capturing the image using a camera of a mobile device rather than a traditional flat-bed scanner, paper-feed scanner or other similar multifunction peripheral (MFP)).

Regarding performing cropping based on classification, and similar to the principles discussed above regarding rectangularization, it may be advantageous in some approaches to utilize information known about an object belonging to a particular object class to improve cropping of digital images depicting the object such that all or significantly all of the cropped image depicts the object and not image background (or other objects, artifacts, etc. depicted in the image).

As a simple example, it may be advantageous to determine an object's known size, dimensions, configuration, etc. according to the object classification and utilize this information to identify a region of the image depicting the object from regions of the image not depicting the object, and define crop lines surrounding the object to remove the regions of the image not depicting the object.

Regarding performing binarization based on classification, the presently disclosed classification algorithms provide several useful improvements to mobile image processing. Several exemplary embodiments of such improvements will now be described.

For example, binarization algorithms generally transform a multi-tonal digital image (e.g. grayscale, color, or any other image such as image exhibiting more than two tones) into a bitonal image, i.e. an image exhibiting only two tones (typically white and black). Those having ordinary skill in the art will appreciate that attempting to binarize a digital image depicting an object with regions exhibiting two or more distinct color profiles and/or color schemes (e.g. a region depicting a color photograph as compared to a region depicting a black/white text region, a color-text region, a symbol such as a reference object, watermark, etc. object background region, etc.) may produce an unsuccessful or unsatisfactory result.

As one explanation, these difficulties may be at least partially due to the differences between the color profiles, schemes, etc., which counter-influence a single binarization transform. Thus, providing an ability to distinguish each of these regions having disparate color schemes or profiles and define separate binarization parameters for each may greatly improve the quality of the resulting bitonal image as a whole and with particular respect to the quality of the transformation in each respective region.

According to one exemplary embodiment, improved binarization may include determining an object class color profile and/or scheme (e.g. determining a color profile and/or color scheme for object background region); adjusting one or more binarization parameters based on the object class color profile and/or color scheme; and thresholding the digital image using the one or more adjusted binarization parameters.

Binarization parameters may include any parameter of any suitable binarization process as would be appreciated by those having ordinary skill in the art reading the present descriptions, and binarization parameters may be adjusted according to any suitable methodology. For example, with respect to adjusting binarization parameters based on an object class color profile and/or color scheme, binarization parameters may be adjusted to over- and/or under-emphasize a contribution of one or more color channels, intensities, etc. in accordance with the object class color profile/scheme (such as under-emphasizing the red channel for an object class color profile/scheme relatively saturated by red hue(s), etc.).

Similarly, in other embodiments, improved binarization may include determining an object class mask, applying the object class mask to the digital image and thresholding a subregion of the digital image based on the object class mask. The object class mask may be any type of mask, with the condition that the object class mask provides information regarding the location of particular regions of interest characteristic to objects belonging to the class (such as a region depicting a color photograph, a region depicting a black/white text region, a color-text region, a symbol region depicting a symbol such as a reference object, watermark, etc., an object background region, etc.) and enabling the selective inclusion and/or exclusion of such regions from the binarization operation(s).

For example, improved binarization includes determining an object class mask identifying regions such as discussed immediately above and applying the object class mask to exclude from binarization all of the digital image except a single region of interest, such as object background region. Alternatively the entire digital image may be masked-out and a region of interest such as object background region subsequently masked-in to the binarization process. Moreover, in either event the masking functionality now described with reference to may be combined with the exemplary color profile and/or color scheme information functionality described above, for example by obtaining both the object class mask and the object color profile and/or color scheme, applying the object class mask to exclude all of the digital image from binarization except object background region, adjusting one or more binarization parameters based on the object background region color profile and/or color scheme, and thresholding the object background region using the adjusted binarization parameters.

Extending the principle, multiple regions of interest may be masked-in and/or masked-out using object class mask to selectively designate regions and/or parameters for binarization in a layered approach designed to produce high-quality bitonal images. For example, as multiple text regions may be retained for binarization (potentially using adjusted parameters) after applying object class mask, for example to exclude all non-text regions from binarization, in some approaches.

Similarly, it may be advantageous to simply exclude only a portion of an image from binarization, whether or not adjusting any parameters. For example, with reference to, it may be desirable to mask-out a unique region of a digital image, such as a region depicting a color photograph, using an object class mask. Then, particularly in approaches where the remaining portion of the digital image is characterized by a single color profile and/or color scheme, or a small number (i.e. no more than 3) substantially similar color profile and/or color schemes, binarization may be performed to clarify the remaining portions of the digital image. Subsequently, the masked-out unique region may optionally be restored to the digital image, with the result being an improved bitonal image quality in all regions of the digital image that were subjected to binarization coupled with an undisturbed color photograph in the region of the image not subjected to binarization.

In still more embodiments, it may be advantageous to perform optical character recognition (OCR) based at least in part on the classification and/or result of classification. Specifically, it may be advantageous to determine information about the location, format, and/or content of text depicted in objects belonging to a particular class, and modify predictions estimated by traditional OCR methods based on an expected text location, format and/or content. For example, in one embodiment where an OCR prediction estimates text in a region corresponding to a "date" field of a document reads "Jan., 14, 2011" the presently disclosed algorithms may determine the expected format for this text follows a format such as "[Abbreviated Month][.] [##][,][####]" the algorithm may correct the erroneous OCR predictions, e.g. converting the comma after "Jan" into a period and/or converting the letter "l" at the end of 2011" into a numerical one character. Similarly, the presently disclosed algorithms may determine the expected format for the same text is instead "[##]/[##]/[####]" and convert "Jan" to "01" and convert each set of comma-space characters ", "into a slash "/" to correct the erroneous OCR predictions.

2) No new matter has been added. The following is merely a verbatim recitation of the disclosures in paragraphs [0065]-[0128] as originally provided in U.S. patent application Ser. No. 13/802,226, filed Mar. 13, 2013. These disclosures were incorporated by reference in Applicant's specification as originally filed, and are now expressly included for the reader's convenience alone. (see p. 63, first full paragraph).

3) Applicant has removed any reference to Figures or elements (e.g. method 500, 600, and constituent operations 502, 504, 506; 602, 604, 606, etc. of FIGS. 5 and 6, respectively as-filed with) that would have been potentially conflicting with Figures and/or elements included with the instant application as-filed with U.S. patent application Ser. No. 13/802,226 on Mar. 13, 2013.

In one illustrative approach, an extracted identifier is analyzed, and determined to have characteristics of a "payment amount" identifier type. In particular, the extracted identifier: exhibits one or more of the characteristic "payment amount" string length (e.g. six characters); string alphabet (e.g. letters, numerals, and currency symbols); and/or pattern (e.g. a currency symbol character such as "$", "£", or "€" followed by two numeral characters, a decimal or period symbol "." and two additional numeral characters, e.g. "$19.99" "£10.00" or "€ 01.23", etc.) In other approaches, the identifier may be determined exhibit characteristics such as consisting of characters expressed only in numerical digits, such a street or room number of an address, etc.

Upon determining the identifier characteristics, the extracted identifier may be analyzed to determine whether any convention(s) or rule(s) describing the identifier characteristics are violated, which may be indicative of the extracted identifier including OCR errors, improper data normalization, or both, in various approaches. In one example, an extracted identifier fails to match any of the corresponding data in the one or more data sources based on a first comparison therebetween. In response to the matching failure, the extracted identifier is analyzed and determined to be of an identifier type "account number," based at least in part on the extracted string being sixteen characters in length. The extracted identifier is further analyzed and determined to violate an "account number" characteristic. The analysis reveals that while account number strings consist of numeral characters, the extracted identifier includes a non-numeral character, e.g. because one character in the extracted identifier string was improperly determined to be a letter "B" instead of a numeral "8," a letter "l" instead of a numeral "1", a letter "O" instead of a numeral "0," etc. as would be understood by one having ordinary skill in the art upon reading the present descriptions.

The OCR error may be corrected using a second OCR iteration based at least in part upon establishing the identifier characteristic(s). In the foregoing example of an account number erroneously including an alphabetic character instead of a numeral, the OCR engine may be restricted to an alphabet of candidate characters consisting entirely of numerical digits. The decision to restrict the OCR alphabet, in turn is based on predefined business rules applying to the format of the account number, i.e. that the account number consists of numerical digits. The second iteration, accordingly, properly recognizes the "8" numeral in the identifier, rather than the "B" letter erroneously determined from the first iteration. Preferably, the identifier complies with at least one business rule, such as described above. More preferably, the business rule(s) may be expressed as at least one logical expression (e.g. a rule, formula, a pattern, convention, structure, organization, etc. or any number or combination thereof).

Those having ordinary skill in the art will appreciate that similar business rules may inform an OCR process regarding how to define the extracted identifier string in a variety of situations differing from the numeral/character distinction exemplified above.

For example, in one embodiment a business rule may indicate that a particular alphabet of symbols should be used, e.g. as opposed to a more complete or different alphabet of symbols. The business rule indicates an account number follows a convention including hyphen symbol characters, i.e. "-", but excludes dash symbol characters (i.e. "--"), underscore symbol characters (i.e. "_") and space characters (i.e. " "). Accordingly, if a first iteration does not successfully extract an identifier matching corresponding data, e.g. in the complementary document, a second iteration may be performed using a more restricted alphabet to normalize the extraction results according to the expectations reflected in the business rule(s).

In another illustrative embodiment, a financial document may display only a portion of an identifier, particularly a confidential, secure, or otherwise sensitive identifier such as an account number, expiration date, security code, or PIN. For example, a sixteen digit account number may commonly be at least partially masked on certain financial documents. The mask may obstruct or replace one or more of the account number characters. In one instance, a masked account number may display only the last four digits of an account number, e.g. "XXXX-XXXX-XXXX-1234" or

for a typical sixteen-digit credit/debit card account number, or the last four digits of a social security number, e.g. "XXX-XX-1234" or

A first iteration may produce OCR results that include the masked characters, or erroneous attempts to extract and/or identify the mask symbols (i.e. "X" and "■" in the examples above). Based in whole or in part on a predefined business rule defining a particular type of document as representing identifiers that are partially masked, a second iteration may account for the masking to ensure the extracted identifier is properly normalized to allow appropriate comparison with the corresponding data. Accounting for the mask may take any suitable form, such as restricting the OCR alphabet to exclude the mask symbols, reformatting the extracted identifier to exclude or modify masked characters, ignoring or discarding all but a select number of characters or character positions (e.g. extracting only a certain number of characters based on position in the string truncating an extracted identifier string from either end of the string).

In more embodiments, misidentified or missing characters from an identifier string may be compiled from a plurality of financial documents. Some or all of the plurality of financial documents may be represented in the corresponding data sources, e.g. as a complementary document. Additionally and/or alternatively, a user may capture images of multiple documents submit the multiple images for analysis to extract the identifier. Regardless of the precise nature of the plurality of financial documents and data depicted therein, each character of the identifier string is represented in at least one of the plurality of financial documents. Therefore, in the aggregate, it is possible to compile a complete identifier string from the plurality of partial identifier strings depicted in the plurality of financial documents.

Continuing with the exemplary situation above where some characters are masked on a financial document, in one approach an account statement and remittance slip depicts a sixteen digit account number with the first twelve digits masked, e.g. "XXXX-XXXX-XXXX-1234." The account statement and/or remittance slip also depict data crucial to a financial transaction in which an individual wishes to participate, such as an outstanding balance amount. However, the entire account number may be required to locate corresponding information in a complementary document for normalization. In order to accomplish the desired normalization, the individual may take an image of an additional financial document depicting the entire account number, such as a credit or debit card, and submit the additional image for analysis. Based on at least one point of commonality between the financial document and the additional financial document, such as an accountholder name matching on the credit card and the account statement, a workflow may supply the missing or erroneous digits of the requisite identifier to allow the desired lookup and ultimately enable participation in the desired financial transaction.

Downstream Financial Processing

In addition to the aforementioned processing of financial documents such as tender documents to accomplish tasks such as retrieval and/or inspection of financial information, it may be advantageous to provide such financial information to one or more downstream processes to facilitate conducting financial transactions.

In one embodiment, for example, downstream financial processing may include detecting an attempt to initiate a financial transaction. Preferably, the detection (especially in the context of mobile devices) may be performed as a background process that observes a user's activity using a device, and determines when the user activity engages, invokes, or otherwise interfaces with a financial process (e.g. submitting a payment, viewing a "cart," viewing a financial account statement, etc. as would be understood by one having ordinary skill in the art upon reading the present descriptions).

In response to detecting the attempt to initiate a financial transaction, downstream financial processing may prompt a user to take pertinent action with respect to tender documents, such as prompting the user to capture an image of the tender document using a capture component of the mobile device, prompting the user to designate a form of payment for the financial transaction (the form of payment including the tender document and/or account information retrieved/located at least in part using the tender document).

In this manner, the overall user experience may be streamlined to facilitate ease of integration between existing financial resources available to the user and any transactions which the user wishes to engage, whether from within a web browser, an application configured to perform the image processing and/or financial processing, or a third party application from which the user attempts to initiate the financial transaction. The user prompt may be issued in any suitable format, such as a pop-up window in a browser, a push notification on a mobile device, etc. as would be understood by one having ordinary skill in the art upon reading the present descriptions.

For example, in one embodiment an application is installed on a mobile device. The application, hereafter referred to as a "tender document wallet app" or "app" is configured to perform image processing and/or determine account information relating to a tender document facilitates determining when a user attempts to initiate a financial transaction using the mobile device. The app is also configured to detect when a user of the mobile device attempts to initiate a financial transaction. In one approach, the app may detect such attempts by instantiating a background process that "watches" the user's activity on the mobile device, e.g. web browsing activity, "App Store" interactions, etc. In one instance, the background process may detect the user invoking a financial transaction interface by recognizing the presence of one or more predetermined symbols, characters, strings, etc. as would be understood by one having ordinary skill in the art upon reading the present descriptions.

Moreover, while the presently described examples are illustrated with respect to a "background process" observing user behavior via an app, it should be understood that the inventive concepts presented herein may also be leveraged with respect to equivalent techniques of observing user behavior. For example, other suitable techniques for observing user behavior may utilize a web browser plugin to observe browser behavior, an app with a browser plugin to observe interactions between the app and a web browser, etc. as would be understood by one having ordinary skill in the art upon reading the present descriptions.

For example, in one approach the background process may register detection of an attempt to initiate a financial transaction when a user's browser or a third party application loads, navigates to, or otherwise invokes a web page, web page component, or interface (e.g. within a third party application) via a secured protocol (e.g. hypertext transfer protocol secure (HTTPS)). Moreover, the web page or interface may preferably display or contain one or more indicators of a financial transaction, and the background process may register detection of the attempt to initiate the financial transaction in response to detecting presence of one or more of the financial indicators, preferably in combination with detecting the invocation of such web page, component, or interface via the secured protocol.

As understood herein, indicators of a financial transaction may in various embodiments include one or more symbols, such as a dollar sign "$" or the abbreviation "USD" (or other similar symbols and/or abbreviations commonly associated with currencies other than the U.S. dollar); one or more words, particularly those commonly associated with processing a financial transaction, such as "subtotal," "total," "tax," "shipping," "billing," "payment center," "cart," "checkout," etc.; one or more numbers, especially in a format typically representing an amount of currency (e.g. a string of integers followed by a period or decimal and two additional integers, or a similar string wherein the integers preceding the period may be punctuated by commas at intervals of three integers, such as 123,456,789.00), one or more fillable fields, especially fields requiring or accepting only input fitting one of the aforementioned formats; etc. as would be understood by one having ordinary skill in the art upon reading the present descriptions.

In some approaches, upon detecting an attempt to initiate a financial transaction via the background process, the app may prompt the user to provide a method of payment therefor. The payment prompt may be issued utilizing any suitable technique or mechanism, and preferably includes an interface allowing a user to manually input financial information, to retrieve previously stored information (as described in further detail below), or to automatically input financial information, e.g. by capturing an image of a tender document and processing the image according to the techniques described herein to extract, correct and/or normalize financial information such as an identifier.

In further embodiments, upon detecting an attempt to initiate a financial transaction and preferably prior to prompting the user to provide a method of payment therefor, the app directs the mobile device to query previously stored information regarding one or more tender documents owned by the user, i.e. tender documents in the owner's "wallet." Previously stored information may include one or more of image data depicting a tender document and any data associated therewith, particularly any associated metadata. Preferably, the query operation seeks potentially eligible forms of payment applicable to the transaction the user is attempting to initiate, for example by determining that some or all of the associated data (e.g. an account or credit card number, expiration date, accountholder name, etc. such as described herein) match a format of one of the fillable fields displayed via the attempted financial transaction page or interface; by determining that an authority or entity issuing/servicing one of the tender documents in the wallet is a same entity as servicing the financial transaction or a same entity with which the financial transaction is being conducted (e.g. a checkout interface is invoked within a particular retailer's website or application, and the user's wallet includes a tender document issued by that retailer, or similarly the checkout interface accepts payments from a particular financial servicer, and the user's wallet includes a tender document issued/serviced by that financial servicer, etc.)

In one embodiment, preferably upon determining the user owns a potentially eligible form of payment (e.g. a suitable tender document exists in the user's wallet) the app may prompt the user to designate a form of payment for the financial transaction. Preferably, if the user's wallet contains any eligible forms of payment, the app suggests one of the tender documents as a form of payment. More preferably, the suggestion is based at least in part on one or more predetermined ranking criteria to determine a preferred tender document from among a plurality of eligible tender documents to use as the form of payment.

In various approaches, ranking criteria may include financial criteria such as an account balance being greater than a minimum threshold (e.g. a user-defined value, or a payment amount associated with the financial transaction), an account balance being lower than a maximum threshold (e.g. a credit limit for a credit card tender document), a benefit or reward being associated with one among the plurality of tender documents (or similarly a preferred benefit or reward among a plurality of available benefits or rewards), an account having at least a minimum value (e.g. an available credit line being at least a minimum value), an account or form of payment being valid within a predetermined window of time (e.g. an expiration date being a future date, or a date at least a minimum duration in the future (such as 30 days, six months, one year, etc.), or any equivalent thereof that would be recognized by one having ordinary skill in the art upon reading the present descriptions.

Ranking criteria may additionally and/or alternatively include usage criteria such as a tender document having previously been used (or conversely not used) to process financial transactions with the retailer or servicer of the attempted financial transaction, a tender document having been used most recently (e.g. "last used") or most frequently (e.g. "favorite(s)") among a plurality of the tender documents, a tender document having been used (or not used) within a predetermined window of time, e.g. a tender document having (not) been used in the past 30 days, etc. as would be understood by one having ordinary skill in the art upon reading the present descriptions.

The payment prompting preferably occurs in response to detecting one or more of (a) the attempt to initiate the financial transaction, and (b) the user capturing the image of the tender document, enabling context-sensitive prompting to streamline the overall user experience. More specifically, upon detecting the attempt to initiate the financial transaction and the existence of one or more eligible form(s) of payment in the user's wallet, the app prompts the user to designate one from among the eligible form(s) of payment in the wallet. Conversely, upon detecting the attempt to initiate the financial transaction and the nonexistence of one or more eligible form(s) of payment in the user's wallet, the app prompts the user to either manually input requisite information or capture an image of a new tender document to process and from which to obtain any financial information requisite to complete the transaction, either directly or via one or more database queries such as described above.

As described briefly in some contexts above, it may be useful to determine the account balance for a tender document. For example, and as will be appreciated by one having ordinary skill in the art upon reading the present descriptions, it may be advantageous to detect when an account balance corresponding to a tender document is less than a threshold value, which may be a user-defined value, a preset value such as a minimum deposit amount for a checking account, or a purchase amount of an attempted financial transaction, etc. in various approaches. In response to detecting the account balance is less than the threshold value, the app may preferably prompt the user to add funds to an account corresponding to the tender document, effectively "recharging" a prepaid account or card, for example.

Advantageously, the account balance associated with the tender document may be updated in real-time, e.g. by manipulating data associated with the tender document in the wallet, and independently of any corresponding records maintained by the financial servicer or retailer to which the tender document relates.

Of course, the various embodiments set forth herein may be implemented utilizing hardware, software, or any desired combination thereof. For that matter, any type of logic may be utilized which is capable of implementing the various functionality set forth herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving an image of a document;
   performing optical character recognition (OCR) on the image;
   extracting an identifier of the document from the image based at least in part on the OCR;
   comparing the extracted identifier with contend from one or more data sources;
   requesting complementary information from at least one of the one or more data sources based at least in part on the extracted identifier;
   receiving the complementary information; and
   outputting at least some of the complementary information to one or more of a display and a memory.

2. The method as recited in claim 1, wherein the extracted identifier is a portion of a complete identifier the method further comprising:
   determining the extracted identifier is a partial identifier based on one or more predefined business rules;
   receiving one or more additional document images;
   performing optical character recognition on at least some of the additional document images;
   extracting at least one additional identifier corresponding to the extracted identifier from the additional document image(s);
   normalizing the extracted identifier based at least in part on the additional extracted identifier(s) and the predefined business rule(s), and
   wherein the one or more data sources comprise at least one of:
   one or more tables;
   one or more relational databases;
   one or more nontraditional databases;
   one or more structured documents; and
   one or more images of one or more non-tender documents.

3. The method as recited in claim 1, further comprising providing at least some of the complementary information to a business transaction.

4. The method as recited in claim 1, further comprising detecting an attempt to initiate a financial transaction; and
   prompting a user to capture the image of the tender document using a capture component of a mobile device,
   wherein the prompting occurs at least partially in response to detecting the attempt to initiate the financial transaction.

5. The method as recited in claim 4, further comprising prompting the user to designate a form of payment for the financial transaction, wherein the tender document corresponds to the form of payment.

6. The method as recited in claim 1, further comprising:
   classifying the tender document;
   determining the extracted identifier includes at least one error, based on the tender document classification and one or more predefined business rules, and
   wherein at least one of the errors corresponds to either a misidentified character or a missing character in the extracted identifier.

7. The method as recited in claim 1, further comprising
   determining an account balance for an account corresponding to the document; and
   informing a user of the account balance in response to determining the account balance is greater than or equal to a threshold account balance;
   detecting one or more OCR errors in the extracted identifier based on one or more predefined business rules and the complementary information; and correcting the one or more OCR errors using the complementary information and based at least in part on one or more of the predefined business rules in response to determining the OCR error corresponds to one of a predefined set of acceptable errors; and wherein the predefined business rules comprise business-oriented data processing criteria.

8. The method as recited in claim 1, further comprising:
determining the extracted identifier corresponds to a payment amount identifier;
determining an account balance for an account corresponding to the tender document based on the extracted identifier; and
prompting a user to add funds to the account in response to determining the account balance is less than either a threshold account balance or a value represented by the payment amount identifier.

9. The method as recited in claim 8, further comprising receiving user input comprising instructions to add an amount of funds to the account corresponding to the tender document; and updating an account balance of the account corresponding to the tender document in response to receiving the user input, and
wherein the amount of funds is selected from:
a user-defined amount;
a value of the tender document;
a payment amount of an attempted financial transaction;
a difference between the payment amount of the attempted financial transaction and the account balance of the account corresponding to the tender document; and
a predetermined integer, and
wherein a source of the amount of funds comprises one or more of:
the tender document;
an auxiliary account available to the user; and
a line of credit available to the user.

10. The method as recited in claim 1, further comprising detecting a problem with at least one of the extracting, the comparing and the requesting.

11. The method as recited in claim 1, further comprising prompting a user for input relating to the document; and
receiving the user input via the mobile device,
analyzing the extracted identifier to determine whether the extracted identifier adheres to one or more business rules defining the identifier;
normalizing the extracted identifier in response to determining the extracted identifier does not adhere to one or more of the business rules defining the identifier; and
validating the normalized identifier based on the business rules defining the identifier and the complementary information;
wherein at least one of the comparing and the requesting is further based at least in part on the received user input, and
wherein the document is a tender document.

12. The method as recited in claim 1, further comprising:
detecting a problem with at least one of the extracting, the comparing and the requesting; and
prompting a user for input relating to the document at least partially in response to detecting the problem.

13. The method as recited in claim 1, further comprising classifying the document based at least in part on one or more characteristics of the image, wherein the classifying further comprises:
generating a first representation of the image; and
generating one or more feature vectors;
wherein the one or more feature vectors are based at least in part on at least one characteristic value corresponding to at least one feature descriptive of a portion of the first representation of the image, and
wherein the document is a tender document.

14. The method as recited in claim 13, further comprising associating data with the image, the associated data comprising one or more of the extracted identifier and the complementary information;
storing the image and the associated data;
detecting an attempt to initiate a financial transaction;
retrieving financial information comprising one or more of the stored image and the stored data associated with the image; and
providing at least some of the retrieved financial information to the financial transaction.

15. The method as recited in claim 14, wherein the image characteristics comprise a statistical measure of one or more of a pixel brightness, a pixel intensity value in one or more color channels, a pixel density, an image aspect ratio, and a tender document aspect ratio.

16. The method as recited in claim 13, father comprising:
processing the received image using one or more processing parameters,
wherein the processing parameter(s) are selected based on the tender document classification, and
wherein the processing comprises on or more of: page detection, object detection, rectangularization, and binarization.

17. The method as recited in claim 13, wherein the first representation of the image comprises a reduced-resolution representation of the tender document.

18. The method as recited in claim 13, wherein the classifying is further based at least in part on one or more features of the tender document, and
wherein the tender document features comprise one or more of: a presence of a reference object, a position of the reference object, a partial or complete color profile of the tender document, a tender document orientation, and a spatial position of one or more text elements within the tender document.

19. The method as recited in claim 13, wherein the classifying comprises determining one or more of:
a tender document type;
a retailer relating to the tender document; and
a financial servicing entity relating to the tender document.

20. The method as recited in claim 13, wherein the classifying comprises comparing a feature vector corresponding to the one or more image characteristics to at least one reference feature matrix, each reference feature matrix corresponding to a unique set of characteristics of a particular class of tender document.

21. The method as recited in claim 13, further comprising:
building an extraction model for the tender document based at least in part on a classification of the tender document, wherein the extraction model is configured to extract content from the tender document based at least in part on the image characteristic(s) upon which the classification was at least partially based.

22. The method as recited in claim 21, further comprising extracting content from the tender document,
wherein the extraction is based at least in part on the extraction model, and
wherein the extraction comprises:
identifying one or more extraction targets based on the extraction model;

determining an expected format of data corresponding to one or more of the extraction target(s);

extracting at least one of the extraction target(s);

normalizing data obtained from the extraction targets based at least in part on one or more of:

the tender document classification, the complementary information, and one or more predefined business rules.

23. The method as recited in claim 20, wherein each unique set of characteristics comprises one or more of:

at least one image characteristic determined from one or more images of tender documents belonging to the particular class of tender document; and at least one feature of tender documents belonging to the particular class of tender document.

24. A computer program product, comprising a computer readable storage medium having stored thereon computer readable instructions configured to cause a processor to:

receive an image of a document;

perform optical character recognition (OCR) on the image;

extract an identifier of the document from the image based at least in part on the OCR;

compare the extracted identifier with content from one or more data sources;

request complementary information from at least one of the one or more data sources based at least in part on the extracted identifier;

receive the complementary information; and output at least some of the complementary information to at least one of a display and a memory.

25. A system, comprising:

a processor; and logic in and/or executable by the processor, and configured to cause the processor to:

receive an image of a document;

perform optical character recognition (OCR) on the image;

extract an identifier of the document from the image based at least in part on the OCR;

compare the extracted identifier with content from one or more data sources;

request complementary information from at least one of the one or more data sources based at least in part on the extracted identifier;

receive the complementary information; and output at least some of the complementary information to at least one of a display and a memory.

* * * * *

UNITED STATES PATENT AND TRADEMARK OFFICE
CERTIFICATE OF CORRECTION

PATENT NO. : 8,879,846 B2  Page 1 of 1
APPLICATION NO. : 14/175999
DATED : November 4, 2014
INVENTOR(S) : Jan W. Amtrup et al.

It is certified that error appears in the above-identified patent and that said Letters Patent is hereby corrected as shown below:

In the specification:

col. 15, cprior: of Table 3, replace "nonconseculive" with --nonconsecutive--;

col. 15, calignment: of Table 3, replace "fee" with --the--;

col. 17, line 46 replace "dine." with --cline.--;

col. 20, line 39 replace "member" with --number--;

col. 26, line 66 replace ""####-####-####"" with --"####-####-####-####"--;

col. 35, lines 14-15 replace "patters," with --patterns,--.

In the claims:

col. 44, line 8 replace "contend" with --content--.

Signed and Sealed this
Thirtieth Day of June, 2015

Michelle K. Lee
*Director of the United States Patent and Trademark Office*